(12) United States Patent
Sugimoto

(10) Patent No.: US 12,556,810 B2
(45) Date of Patent: Feb. 17, 2026

(54) IMAGING CONTROL DEVICE, METHOD, IMAGING SYSTEM, AND COMPUTER READABLE MEDIUM FOR COOPERATION IMAGING USING MULTIPLE IMAGING DEVICES

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 18/413,032

(22) Filed: Jan. 16, 2024

(65) Prior Publication Data

US 2024/0155223 A1 May 9, 2024

Related U.S. Application Data

(63) Continuation of application No. PCT/JP2022/026576, filed on Jul. 4, 2022.

(30) Foreign Application Priority Data

Jul. 29, 2021 (JP) ................................ 2021-124856

(51) Int. Cl.
*H04N 23/60* (2023.01)
*H04N 23/61* (2023.01)
*H04N 23/66* (2023.01)

(52) U.S. Cl.
CPC ............. *H04N 23/64* (2023.01); *H04N 23/61* (2023.01); *H04N 23/66* (2023.01)

(58) Field of Classification Search
CPC .......... G03B 15/00; G03B 5/00; H04N 23/61; H04N 23/64; H04N 23/66; H04N 7/18; H04N 7/181
See application file for complete search history.

(56) References Cited

U.S. PATENT DOCUMENTS

| 11,105,321 | B2 | 8/2021 | Mizukoshi |
| 12,408,653 | B1 * | 9/2025 | Lethin ................... A01M 29/06 |
| 2006/0017812 | A1 | 1/2006 | Kogane et al. |
| 2017/0026680 | A1 | 1/2017 | Sugio et al. |

(Continued)

FOREIGN PATENT DOCUMENTS

| EP | 3691247 | 8/2020 |
| JP | 2000083246 | 3/2000 |

(Continued)

OTHER PUBLICATIONS

"International Search Report (Form PCT/ISA/210) of PCT/JP2022/026576," mailed on Aug. 16, 2022, with English translation thereof, pp. 1-5.

(Continued)

*Primary Examiner* — Antoinette T Spinks
(74) *Attorney, Agent, or Firm* — JCIPRNET

(57) ABSTRACT

An imaging control device includes: a memory; and a processor, the memory records a captured image obtained by capturing with a first imaging device and imaging information related to the imaging in association with each other, and the processor is configured to perform imaging control of controlling imaging with a second imaging device different from the first imaging device, based on at least any one of the captured image or the imaging information.

15 Claims, 21 Drawing Sheets

(56) References Cited

U.S. PATENT DOCUMENTS

| | | | |
|---|---|---|---|
| 2019/0191146 A1 | 6/2019 | Koyama et al. | |
| 2020/0204786 A1* | 6/2020 | Nakata | G02B 7/30 |
| 2024/0112572 A1* | 4/2024 | Komori | G08G 1/0116 |
| 2025/0097568 A1* | 3/2025 | Lu | H04N 23/675 |

FOREIGN PATENT DOCUMENTS

| | | |
|---|---|---|
| JP | 2001251608 | 9/2001 |
| JP | 2005057592 | 3/2005 |
| JP | 2006041611 | 2/2006 |
| JP | 2007327750 | 12/2007 |
| JP | 2015035686 | 2/2015 |
| JP | 2015204512 | 11/2015 |
| JP | 2018043225 | 3/2018 |
| JP | 2018125699 | 8/2018 |
| JP | 2018129577 | 8/2018 |
| JP | 2019065757 | 4/2019 |
| JP | 2019118136 | 7/2019 |
| JP | 2020198477 | 12/2020 |

OTHER PUBLICATIONS

"International Preliminary Report On Patentability (Form PCT/IPEA/409) of PCT/JP2022/026576," completed on Dec. 6, 2022, with English translation thereof, pp. 1-8.

* cited by examiner

IMAGING CONTROL DEVICE, METHOD, IMAGING SYSTEM, AND COMPUTER READABLE MEDIUM FOR COOPERATION IMAGING USING MULTIPLE IMAGING DEVICES

CROSS REFERENCE TO RELATED APPLICATION

This is a continuation of International Application No. PCT/JP2022/026576 filed on Jul. 4, 2022, and claims priority from Japanese Patent Application No. 2021-124856 filed on Jul. 29, 2021, the entire disclosures of which are incorporated herein by reference.

BACKGROUND OF THE INVENTION

1. Field of the Invention

The present invention relates to an imaging control device, an imaging system, an imaging control method, and a computer readable medium storing an imaging control program.

2. Description of the Related Art

JP2018-043225A1, JP2015-204512A, JP2015-035686A, JP2001-251608A, and JP2018-125699A disclose an imaging control device that manages an imaging position of a camera and imaging data in association with each other for each of a plurality of cameras. For example, JP2018-043225A1 discloses that a dead angle is detected based on imaging video data of a certain camera and a movement instruction signal is output to another camera such that the dead angle is prevented.

JP2019-065757A1, JP2018-129577A, JP2000-083246A, JP2005-057592A, and JP2006-041611A disclose a camera system in which a control device that controls a plurality of cameras decides a control amount of another camera based on an imaging condition of a certain camera. For example, JP2019-065757A1 discloses estimating a next position of a target based on imaging conditions of a plurality of imaging devices and controlling surrounding imaging devices such that the target moved to the position is imaged.

SUMMARY OF THE INVENTION

One embodiment according to the technique of the present disclosure provides an imaging control device, an imaging system, an imaging control method, and a computer readable medium storing an imaging control program capable of facilitating cooperation imaging using a plurality of cameras.

An imaging control device according to an aspect of the present invention is an imaging control device including a memory and a processor, in which the memory records a captured image obtained by capturing with a first imaging device and imaging information related to the imaging in association with each other, and the processor is configured to perform imaging control of controlling imaging with a second imaging device different from the first imaging device, based on at least any one of the captured image or the imaging information.

An imaging system according to an aspect of the present invention comprises a first imaging device, a second imaging device, and an imaging control device including a communication unit that is communicable with the first imaging device and the second imaging device, in which the imaging control device records a captured image obtained by capturing with the first imaging device in association with imaging information related to the imaging, and performs imaging control of controlling imaging with the second imaging device based on at least any one of the captured image or the imaging information.

An imaging control method according to an aspect of the present invention is an imaging control method by an imaging control device including a memory and a processor, the imaging control method including, by the memory, recording a captured image obtained by capturing with a first imaging device and imaging information related to the imaging in association with each other, and by the processor, performing imaging control of controlling imaging with a second imaging device different from the first imaging device, based on at least any one of the captured image or the imaging information.

An imaging control program stored in a computer readable medium according to an aspect of the present invention is an imaging control program executed by an imaging control device including a memory that records a captured image obtained by capturing with a first imaging device and imaging information related to the imaging in association with each other and a processor, the imaging control program causing the processor to execute a process comprising performing imaging control of controlling imaging with a second imaging device different from the first imaging device, based on at least any one of the captured image or the imaging information.

According to the present invention, it is possible to provide the imaging control device, the imaging system, the imaging control method, and the computer readable medium storing the imaging control program capable of facilitating the cooperation imaging using the plurality of cameras.

DESCRIPTION OF THE PREFERRED EMBODIMENTS

Hereinafter, an example of an embodiment of the present invention will be described with reference to the drawings.

Embodiment 1

<Imaging System of Embodiment>

Figure 1:
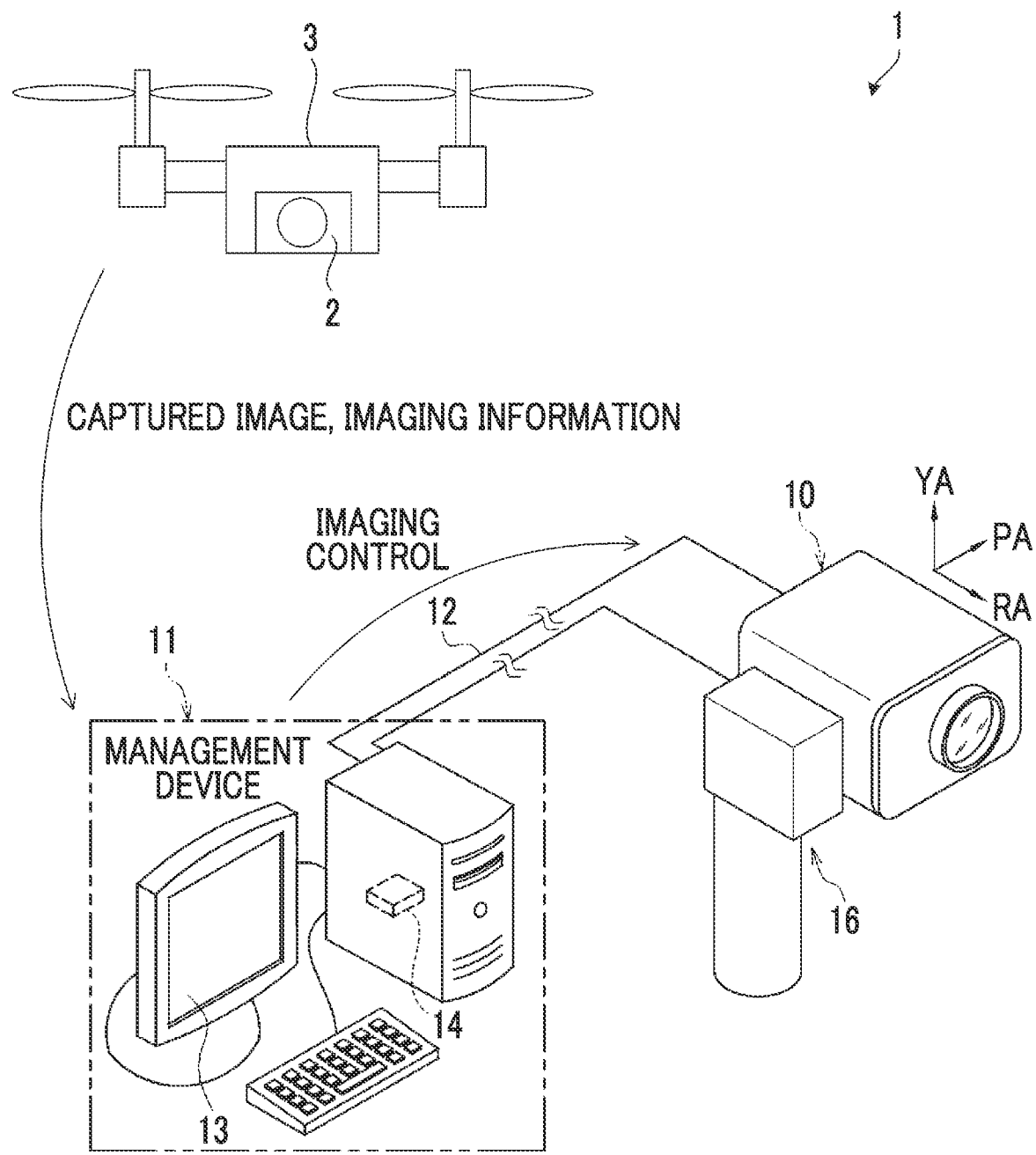
FIG. 1 is a diagram showing an example of an imaging system of Embodiment 1.

FIG. 1 is a diagram showing an example of an imaging system of Embodiment 1. As shown in FIG. 1 as an example, an imaging system 1 includes an aerial camera 2, a ground camera 10, and a management device 11. The aerial camera 2 is an example of a first imaging device according to the embodiment of the present invention. The ground camera 10 is an example of a second imaging device according to the embodiment of the present invention. The management device 11 is an example of an imaging control device according to the embodiment of the present invention.

The aerial camera 2 is an imaging device capable of performing aerial imaging by being mounted in a flying object 3. The flying object 3 is also referred to as a drone, and can fly by control from the outside or fly autonomously. The aerial camera 2 is communicable with the management device 11 and transmits, to the management device 11, a captured image obtained by capturing and imaging information related to the capturing of the captured image. A specific example of the imaging information will be described below (refer to FIG. 6, for example).

The communication between the aerial camera 2 and the management device 11 may be direct wireless communication between the aerial camera 2 and the management device 11, or may be performed via a network with the aerial camera 2 connected to the network via a base station or the like. Further, the communication between the aerial camera 2 and the management device 11 may be performed via a communication unit of the flying object 3 or may be performed without passing through the communication unit of the flying object 3.

The ground camera 10 is installed, via a revolution mechanism 16 to be described below, in an indoor or outdoor post or wall, a part (for example, rooftop) of a building, or the like to image an imaging target that is a subject. Alternatively, the ground camera 10 may be installed on the ground by a tripod or the like (refer to FIG. 8, for example). Further, the ground camera 10 transmits, to the management device 11 via the communication line 12, the captured image obtained by capturing and the imaging information related to the capturing of the captured image.

The management device 11 comprises a display 13 and a secondary storage device 14. Examples of the display 13 include a liquid crystal display, a plasma display, an organic electro-luminescence (EL) display, and a cathode ray tube (CRT) display.

An example of the secondary storage device 14 includes a hard disk drive (HDD). The secondary storage device 14 is not limited to the HDD, and may be a non-volatile memory such as a flash memory, a solid state drive (SSD), or an electrically erasable and programmable read only memory (EEPROM).

The management device 11 receives the captured image or imaging information transmitted by the aerial camera 2 or the ground camera 10, and displays the received captured image or imaging information on the display 13 or stores the received captured image or imaging information in the secondary storage device 14.

The management device 11 records, for example, the captured image obtained by the imaging with the aerial camera 2 and the imaging information related to the capturing of the captured image in association with each other. The captured image and the imaging information will be described below (refer to FIG. 6, for example). The management device 11 performs imaging control of controlling the imaging with the ground camera 10 based on at least one of the stored captured image or imaging information of the aerial camera 2. For example, the management device 11 communicates with the ground camera 10 via the communication line 12 to perform the imaging control.

The imaging control is, for example, control of setting, in the ground camera 10, an imaging parameter for the ground camera 10 to perform the imaging. In this case, an imaging person performs the imaging using the ground camera 10 for which the imaging parameter is set (for example, the imaging person presses a shutter button of the ground camera 10). Alternatively, the imaging control may be control of setting, in the ground camera 10, the imaging parameter for the ground camera 10 to perform the imaging and of further causing the ground camera 10 to execute the imaging. In this case, the imaging with the ground camera 10 is automatically performed. A specific example of the imaging control will be described below.

<Revolution of Ground Camera 10 by Revolution Mechanism 16>

Figure 2:
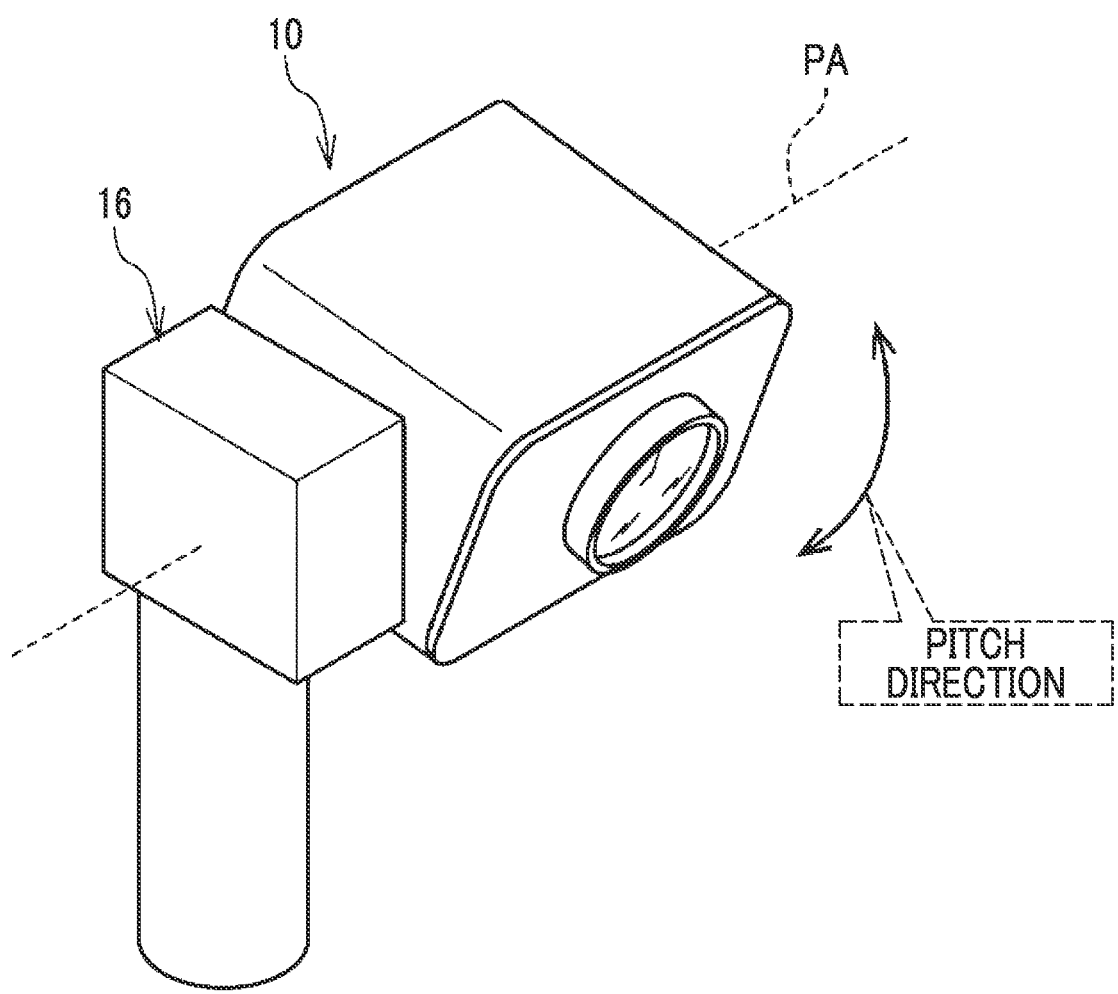
FIG. 2 is a diagram showing an example of revolution of a ground camera 10 in a pitch direction by a revolution mechanism 16.
Figure 3:
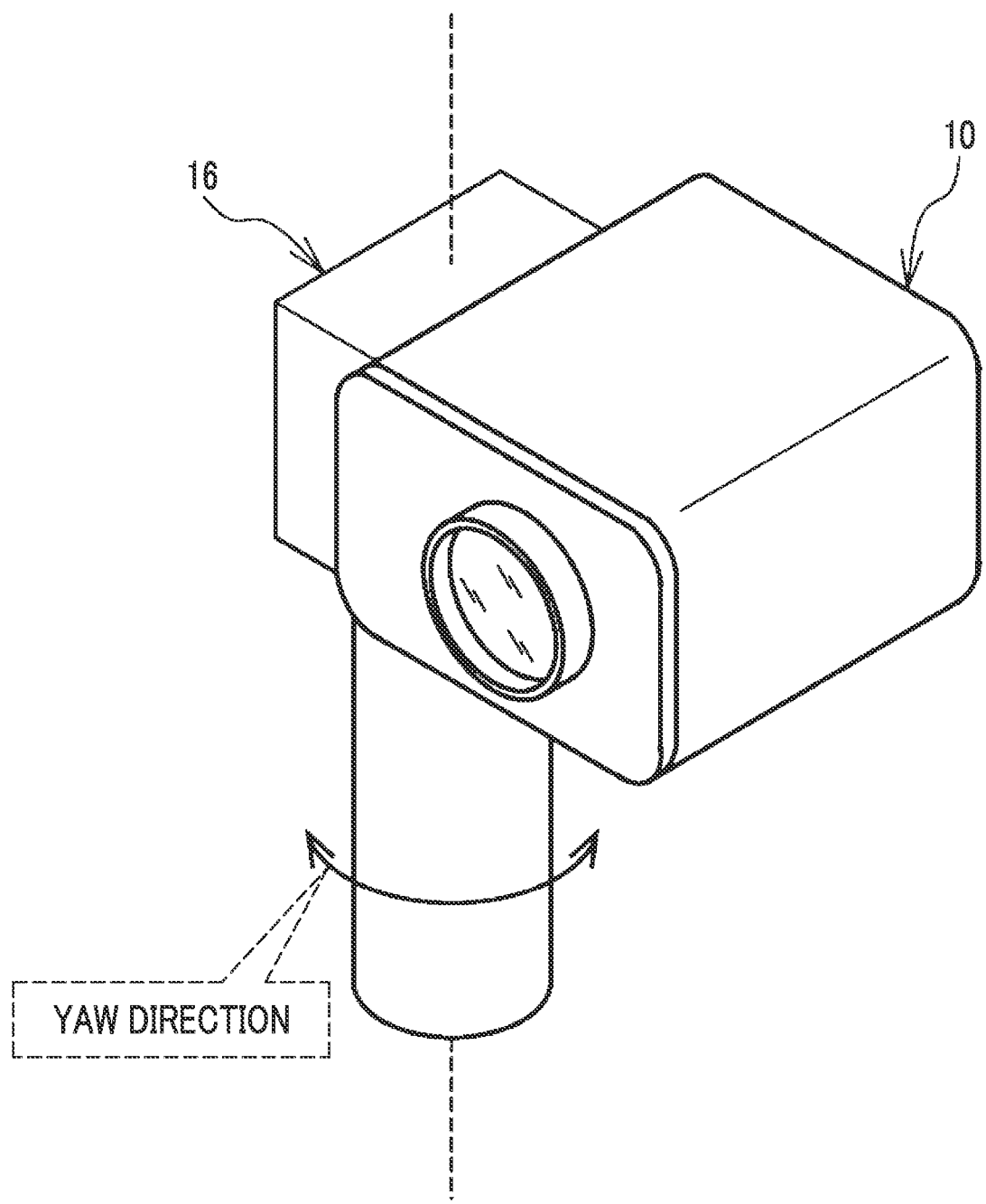
FIG. 3 is a diagram showing an example of the revolution of the ground camera 10 in a yaw direction by the revolution mechanism 16.

FIG. 2 is a diagram showing an example of revolution of the ground camera 10 in a pitch direction by the revolution mechanism 16. FIG. 3 is a diagram showing an example of the revolution of the ground camera 10 in a yaw direction by the revolution mechanism 16. The ground camera 10 is attached to the revolution mechanism 16. The revolution mechanism 16 enables the ground camera 10 to revolve.

Specifically, the revolution mechanism 16 is a two-axis revolution mechanism that enables the ground camera 10 to revolve in a revolution direction (pitch direction) that intersects the yaw direction and that has a pitch axis PA as a central axis, as shown in FIG. 2 as an example, and in a revolution direction (yaw direction) that has a yaw axis YA as a central axis, as shown in FIG. 3 as an example. An example is shown in which the two-axis revolution mechanism is used as the revolution mechanism 16 according to the present embodiment, but the technique of the present disclosure is not limited thereto. A three-axis revolution mechanism or a one-axis revolution mechanism may be used.

<Configuration of Optical System and Electrical System of Ground Camera 10>

Figure 4:
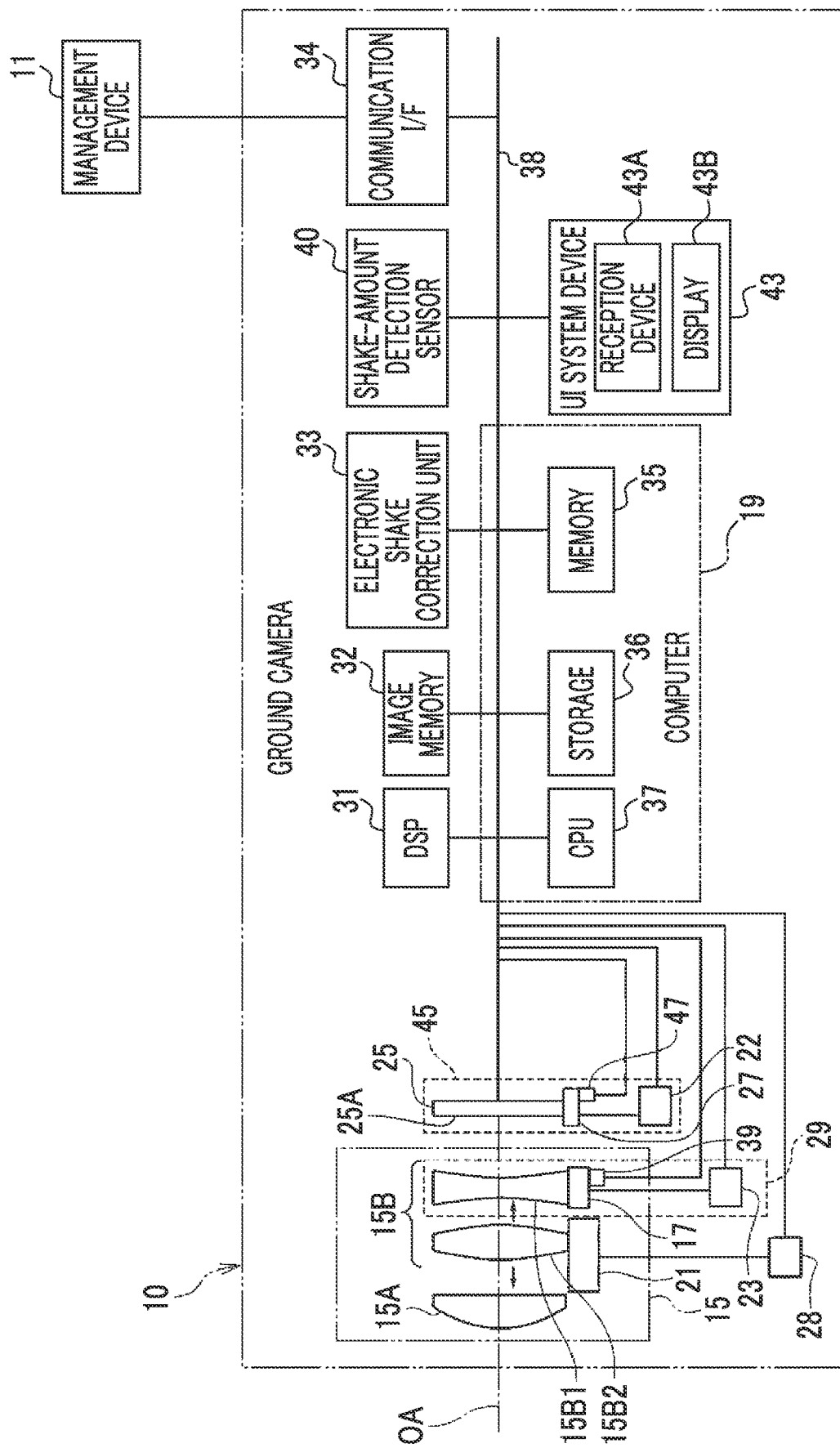
FIG. 4 is a block diagram showing an example of a configuration of an optical system and an electrical system of the ground camera 10.

FIG. 4 is a block diagram showing an example of a configuration of an optical system and an electrical system of the ground camera 10. As shown in FIG. 4 as an example, the ground camera 10 comprises an optical system 15 and an imaging element 25. The imaging element 25 is located in a rear stage of the optical system 15. The optical system 15 comprises an objective lens 15A and a lens group 15B. The objective lens 15A and the lens group 15B are disposed, along an optical axis OA of the optical system 15, over a light-receiving surface 25A side (image side) of the imaging element 25 from a target subject side (object side) in an order of the objective lens 15A and the lens group 15B. The lens group 15B includes an anti-vibration lens 15B1, a focus lens (not illustrated), a zoom lens 15B2, and the like. The zoom lens 15B2 is movably supported along the optical axis OA by a lens actuator 21 described below. The anti-vibration lens 15B1 is movably supported in a direction orthogonal to the optical axis OA by a lens actuator 17 described below.

Since an increase in a focal length by the zoom lens 15B2 sets the ground camera 10 on a telephoto side, an angle of view is decreased (imaging range is narrowed). Since a decrease in the focal length by the zoom lens 15B2 sets the ground camera 10 on a wide angle side, the angle of view is increased (imaging range is widened).

Various lenses (not illustrated) may be provided as the optical system 15 in addition to the objective lens 15A and the lens group 15B. Furthermore, the optical system 15 may comprise a stop. Positions of the lenses, the lens group, and the stop included in the optical system 15 are not limited. For example, the technique of the present disclosure is also effective for positions different from positions shown in FIG. 4.

The anti-vibration lens 15B1 is movable in a direction perpendicular to the optical axis OA, and the zoom lens 15B2 is movable along the optical axis OA.

The optical system 15 comprises the lens actuators 17 and 21. The lens actuator 17 causes force that fluctuates in a direction perpendicular to an optical axis of the anti-vibration lens 15B1 to act on the anti-vibration lens 15B1. The lens actuator 17 is controlled by an optical image stabilizer (OIS) driver 23. With the drive of the lens actuator 17 under the control of the OIS driver 23, the position of the anti-vibration lens 15B1 fluctuates in the direction perpendicular to the optical axis OA.

The lens actuator 21 causes force that moves along the optical axis OA of the optical system 15 to act on the zoom lens 15B2. The lens actuator 21 is controlled by a lens driver 28. With the drive of the lens actuator 21 under the control of the lens driver 28, the position of the zoom lens 15B2 moves along the optical axis OA. With the movement of the position of the zoom lens 15B2 along the optical axis OA, the focal length of the ground camera 10 changes.

For example, in a case where a contour of the captured image is a rectangle having a short side in the direction of the pitch axis PA and having a long side in the direction of the yaw axis YA, the angle of view in the direction of the pitch axis PA is narrower than the angle of view in the direction of the yaw axis YA and the angle of view of a diagonal line.

With the optical system 15 configured in such a manner, an image of light indicating an imaging region is formed on the light-receiving surface 25A of the imaging element 25, and the imaging region is imaged by the imaging element 25.

By the way, vibration provided to the ground camera 10 includes vibration due to passage of automobiles, vibration due to wind, vibration due to road construction, and the like in an outdoor situation, and includes vibration due to an operation of an air conditioner, vibration due to comings and goings of people in an indoor situation. Therefore, in the ground camera 10, a shake occurs due to the vibration provided to the ground camera 10 (hereinafter also simply referred to as "vibration").

In the present embodiment, the term "shake" refers to a phenomenon in which, in the ground camera 10, a target subject image on the light-receiving surface 25A of the imaging element 25 fluctuates due to a change in positional relationship between the optical axis OA and the light-receiving surface 25A. In other words, it can be said that the term "shake" is a phenomenon in which an optical image obtained by the image forming on the light-receiving surface 25A fluctuates due to a tilt of the optical axis OA caused by the vibration provided to the ground camera 10. The fluctuation of the optical axis OA means that the optical axis OA is tilted with respect to a reference axis (for example, the optical axis OA before shake occurs). Hereinafter, the shake that occurs due to the vibration will be simply referred to as "shake".

The shake is included in the captured image as a noise component and affects image quality of the captured image. In order to remove the noise component included in the captured image due to the shake, the ground camera 10 comprises a lens-side shake correction mechanism 29, an imaging element-side shake correction mechanism 45, and an electronic shake correction unit 33, which are used for shake correction.

The lens-side shake correction mechanism 29 and the imaging element-side shake correction mechanism 45 are mechanical shake correction mechanisms. The mechanical shake correction mechanism is a mechanism that corrects the shake by applying, to a shake correction element (for example, anti-vibration lens and/or imaging element), power generated by a driving source such as a motor (for example, voice coil motor) to move the shake correction element in a direction perpendicular to an optical axis of an imaging optical system.

Specifically, the lens-side shake correction mechanism 29 is a mechanism that corrects the shake by applying, to the anti-vibration lens, power generated by a driving source such as a motor (for example, voice coil motor) to move the anti-vibration lens in the direction perpendicular to the optical axis of the imaging optical system. The imaging element-side shake correction mechanism 45 is a mechanism that corrects the shake by applying, to the imaging element, power generated by a driving source such as a motor (for example, voice coil motor) to move the imaging element in the direction perpendicular to the optical axis of the imaging optical system. The electronic shake correction unit 33 corrects the shake by performing image processing on the captured image based on a shake amount. That is, the shake correction unit (shake correction component) mechanically or electronically corrects the shake using a hardware configuration and/or a software configuration. The mechanical shake correction refers to shake correction realized by mechanically moving the anti-vibration lens and/or the shake correction element such as the imaging element using the power generated by the driving source such as the motor (for example, voice coil motor). The electronic shake correction refers to shake correction realized by, for example, the image processing by a processor.

As shown in FIG. 4 as an example, the lens-side shake correction mechanism 29 comprises the anti-vibration lens 15B1, the lens actuator 17, the OIS driver 23, and a position detection sensor 39.

As a method of correcting the shake by the lens-side shake correction mechanism 29, various well-known methods can be employed. In the present embodiment, as the method of correcting the shake, a shake correction method is employed in which the anti-vibration lens 15B1 is caused to move based on the shake amount detected by a shake-amount detection sensor 40 (described below). Specifically, the anti-vibration lens 15B1 is caused to move, by an amount with which the shake cancels, in a direction of canceling the shake to correct the shake.

The lens actuator 17 is attached to the anti-vibration lens 15B1. The lens actuator 17 is a shift mechanism equipped with the voice coil motor and drives the voice coil motor to cause the anti-vibration lens 15B1 to fluctuate in the direction perpendicular to the optical axis of the anti-vibration lens 15B1. Here, as the lens actuator 17, the shift mechanism equipped with the voice coil motor is employed, but the technique of the present disclosure is not limited thereto. Instead of the voice coil motor, another power source such as a stepping motor or a piezo element may be employed.

The lens actuator 17 is controlled by the OIS driver 23. With the drive of the lens actuator 17 under the control of the OIS driver 23, the position of the anti-vibration lens 15B1 mechanically fluctuates in a two-dimensional plane perpendicular to the optical axis OA.

The position detection sensor 39 detects a current position of the anti-vibration lens 15B1 and outputs a position signal indicating the detected current position. Here, as an example of the position detection sensor 39, a device including a Hall element is employed. Here, the current position of the anti-vibration lens 15B1 refers to a current position in an anti-vibration lens two-dimensional plane. The anti-vibration lens two-dimensional plane refers to a two-dimensional plane perpendicular to the optical axis of the anti-vibration lens 15B1. In the present embodiment, the device including the Hall element is employed as an example of the position detection sensor 39, but the technique of the present disclosure is not limited thereto. Instead of the Hall element, a magnetic sensor, a photo sensor, or the like may be employed.

The lens-side shake correction mechanism 29 corrects the shake by causing the anti-vibration lens 15B1 to move along at least one of the direction of the pitch axis PA or the direction of the yaw axis YA in an actually imaged range. That is, the lens-side shake correction mechanism 29 corrects the shake by causing the anti-vibration lens 15B1 to move in the anti-vibration lens two-dimensional plane by a movement amount corresponding to the shake amount.

The imaging element-side shake correction mechanism 45 comprises the imaging element 25, a body image stabilizer (BIS) driver 22, an imaging element actuator 27, and a position detection sensor 47.

In the same manner as the method of correcting the shake by the lens-side shake correction mechanism 29, various well-known methods can be employed as the method of correcting the shake by the imaging element-side shake correction mechanism 45. In the present embodiment, as the method of correcting the shake, a shake correction method is employed in which the imaging element 25 is caused to move based on the shake amount detected by the shake-amount detection sensor 40. Specifically, the imaging element 25 is caused to move, by an amount with which the shake cancels, in a direction of canceling the shake to correct the shake.

The imaging element actuator 27 is attached to the imaging element 25. The imaging element actuator 27 is a shift mechanism equipped with the voice coil motor and drives the voice coil motor to cause the imaging element 25 to fluctuate in the direction perpendicular to the optical axis of the anti-vibration lens 15B1. Here, as the imaging element actuator 27, the shift mechanism equipped with the voice coil motor is employed, but the technique of the present disclosure is not limited thereto. Instead of the voice coil motor, another power source such as a stepping motor or a piezo element may be employed.

The imaging element actuator 27 is controlled by the BIS driver 22. With the drive of the imaging element actuator 27 under the control of the BIS driver 22, the position of the imaging element 25 mechanically fluctuates in the direction perpendicular to the optical axis OA.

The position detection sensor 47 detects a current position of the imaging element 25 and outputs a position signal indicating the detected current position. Here, as an example of the position detection sensor 47, a device including a Hall element is employed. Here, the current position of the imaging element 25 refers to a current position in an imaging element two-dimensional plane. The imaging element two-dimensional plane refers to a two-dimensional plane perpendicular to the optical axis of the anti-vibration lens 15B1. In the present embodiment, the device including the Hall element is employed as an example of the position detection sensor 47, but the technique of the present disclosure is not limited thereto. Instead of the Hall element, a magnetic sensor, a photo sensor, or the like may be employed.

The ground camera 10 comprises a computer 19, a digital signal processor (DSP) 31, an image memory 32, the electronic shake correction unit 33, a communication OF 34, the shake-amount detection sensor 40, and a user interface (UI) system device 43. The computer 19 comprises a memory 35, a storage 36, and a central processing unit (CPU) 37.

The imaging element 25, the DSP 31, the image memory 32, the electronic shake correction unit 33, the communication OF 34, the memory 35, the storage 36, the CPU 37, the shake-amount detection sensor 40, and the UI system device 43 are connected to a bus 38. Further, the OIS driver 23 is connected to the bus 38. In the example shown in FIG. 4, one bus is illustrated as the bus 38 for convenience of illustration, but a plurality of buses may be used. The bus 38 may be a serial bus or may be a parallel bus such as a data bus, an address bus, and a control bus.

The memory 35 temporarily stores various types of information, and is used as a work memory. A random access memory (RAM) is exemplified as an example of the memory 35, but the technique of the present disclosure is not limited thereto. Another type of storage device may be used.

The storage 36 stores various programs for the ground camera 10. The CPU 37 reads out various programs from the storage 36 and executes the readout various programs on the memory 35 to control the entire ground camera 10. An example of the storage 36 includes a flash memory, SSD, EEPROM, or HDD. Further, for example, various non-volatile memories such as a magnetoresistive memory and a ferroelectric memory may be used instead of the flash memory or together with the flash memory.

The imaging element 25 is a complementary metal oxide semiconductor (CMOS) type image sensor. The imaging element 25 images a target subject at a predetermined frame rate under an instruction of the CPU 37. The term "predetermined frame rate" described herein refers to, for example, several tens of frames/second to several hundreds of frames/second. The imaging element 25 may incorporate a control device (imaging element control device). In this case, the imaging element control device performs detailed control inside the imaging element 25 in response to the imaging instruction output by the CPU 37. Further, the imaging element 25 may image the target subject at the predetermined frame rate under an instruction of the DSP 31. In this case, the imaging element control device performs detailed control inside the imaging element 25 in response to the imaging instruction output by the DSP 31. The DSP 31 may be referred to as an image signal processor (ISP).

The light-receiving surface 25A of the imaging element 25 is formed by a plurality of photosensitive pixels (not shown) arranged in a matrix. In the imaging element 25, each photosensitive pixel is exposed, and photoelectric conversion is performed for each photosensitive pixel. A charge obtained by performing the photoelectric conversion for each photosensitive pixel corresponds to an analog imaging signal indicating the target subject. Here, a plurality of photoelectric conversion elements (for example, photoelectric conversion elements in which color filters are disposed) having sensitivity to visible light are employed as the plurality of photosensitive pixels. In the imaging element 25, the photoelectric conversion element having sensitivity to R (red) light (for example, photoelectric conversion element in which an R filter corresponding to R is disposed), the photoelectric conversion element having sensitivity to G (green) light (for example, photoelectric conversion element in which a G filter corresponding to G is disposed), and the photoelectric conversion element having sensitivity to B (blue) light (for example, photoelectric conversion element in which a B filter corresponding to B is disposed) are employed as the plurality of photoelectric conversion elements. In the ground camera 10, the imaging based on the visible light (for example, light on a short wavelength side of about 700 nanometers or less) is performed by using these photosensitive pixels. However, the present embodiment is not limited thereto. The imaging based on infrared light (for example, light on a wavelength side longer than about 700 nanometers) may be performed. In this case, the plurality of photoelectric conversion elements having sensitivity to the infrared light may be used as the plurality of photosensitive pixels. In particular, for example, an InGaAs sensor and/or a simulation of type-II quantum well (T2SL) sensor may be used for short-wavelength infrared (SWIR) imaging.

The imaging element 25 performs signal processing such as analog/digital (A/D) conversion on the analog imaging signal to generate a digital image that is a digital imaging signal. The imaging element 25 is connected to the DSP 31 via the bus 38 and outputs the generated digital image to the DSP 31 in units of frames via the bus 38. The digital image is an example of "captured image" according to the embodiment of the present invention.

Here, the CMOS image sensor is exemplified for description as an example of the imaging element 25, but the technique of the present disclosure is not limited thereto. A charge coupled device (CCD) image sensor may be employed as the imaging element 25. In this case, the imaging element 25 is connected to the bus 38 via an analog front end (AFE) (not illustrated) that incorporates a CCD driver. The AFE performs the signal processing, such as the A/D conversion, on the analog imaging signal obtained by the imaging element 25 to generate the digital image and output the generated digital image to the DSP 31. The CCD image sensor is driven by the CCD driver incorporated in the AFE. Of course, the CCD driver may be independently provided.

The DSP 31 performs various kinds of digital signal processing on the digital image. For example, the various types of digital signal processing refer to demosaicing, noise removal processing, gradation correction processing, and color correction processing.

The DSP 31 outputs the digital image after the digital signal processing to the image memory 32 for each frame. The image memory 32 stores the digital image from the DSP 31. Hereinafter, for convenience of description, the digital image stored in the image memory 32 will be referred to as "captured image".

The shake-amount detection sensor 40 is, for example, a device including a gyro sensor, and detects the shake amount of the ground camera 10. In other words, the shake-amount detection sensor 40 detects the shake amount in each of a pair of axial directions. The gyro sensor detects a rotational shake amount around respective axes (refer to FIG. 1) of the pitch axis PA, the yaw axis YA, and a roll axis RA (axis parallel to the optical axis OA). The shake-amount detection sensor 40 converts the rotational shake amount around the pitch axis PA and the rotational shake amount around the yaw axis YA, which are detected by the gyro sensor, into the shake amount in a two-dimensional plane parallel to the pitch axis PA and the yaw axis YA to detect the shake amount of the ground camera 10.

Here, the gyro sensor is exemplified as an example of the shake-amount detection sensor 40, but this is merely an example. The shake-amount detection sensor 40 may be an acceleration sensor. The acceleration sensor detects the shake amount in the two-dimensional plane parallel to the pitch axis PA and the yaw axis YA. The shake-amount detection sensor 40 outputs the detected shake amount to the CPU 37.

Further, although the form example is shown in which the shake amount is detected by a physical sensor called the shake-amount detection sensor 40, the technique of the present disclosure is not limited thereto. For example, the movement vector obtained by comparing preceding and succeeding captured images in time series, which are stored in the image memory 32, may be used as the shake amount. Further, the shake amount to be finally used may be derived based on the shake amount detected by the physical sensor and the movement vector obtained by the image processing.

The CPU 37 acquires the shake amount detected by the shake-amount detection sensor 40 and controls the lens-side shake correction mechanism 29, the imaging element-side shake correction mechanism 45, and the electronic shake correction unit 33 based on the acquired shake amount. The shake amount detected by the shake-amount detection sensor 40 is used for the shake correction by each of the lens-side shake correction mechanism 29 and the electronic shake correction unit 33.

The electronic shake correction unit 33 is a device including an application specific integrated circuit (ASIC). The electronic shake correction unit 33 corrects the shake by performing the image processing on the captured image in the image memory 32 based on the shake amount detected by the shake-amount detection sensor 40.

Here, the device including the ASIC is exemplified as the electronic shake correction unit 33, but the technique of the present disclosure is not limited thereto. For example, a device including a field programmable gate array (FPGA) or a programmable logic device (PLD) may be used. Further, for example, the electronic shake correction unit 33 may be a device including a plurality of ASICs, FPGAs, and PLDs. A computer including a CPU, a storage, and a memory may be employed as the electronic shake correction unit 33. The number of CPUs may be singular or plural. Further, the electronic shake correction unit 33 may be realized by a combination of a hardware configuration and a software configuration.

The communication I/F 34 is, for example, a network interface, and controls transmission of various kinds of information to and from the management device 11 via the network. An example of the network includes a wide area network (WAN) such as the Internet or a public communication network. The communication I/F 34 performs communication between the ground camera 10 and the management device 11.

The UI system device 43 comprises a reception device 43A and a display 43B. The reception device 43A is, for example, a hard key, a touch panel, and the like, and receives various instructions from a user. The CPU 37 acquires various instructions received by the reception device 43A and operates in response to the acquired instructions.

The display 43B displays various kinds of information under the control of the CPU 37. Examples of the various kinds of information displayed on the display 43B include a content of various instructions received by the reception device 43A and the captured image.

<Configuration of Aerial Camera 2>

Although the configuration of the ground camera 10 has been described in FIG. 4, a configuration of the aerial camera 2 is the same as the configuration of the ground camera 10. However, a configuration corresponding to the communication I/F 34 in the aerial camera 2 is a wireless communication interface that can perform wireless communication with the management device 11 or the base station, or a communication interface that can communicate with the management device 11 via the communication unit of the flying object 3 by communicating with the communication unit of the flying object 3. Further, since the aerial camera 2 is mounted in the flying object 3, various modifications can be made, such as omission of the UI system device 43 and the like.

<Configuration of Electrical System of Revolution Mechanism 16 and Management Device 11>

Figure 5:
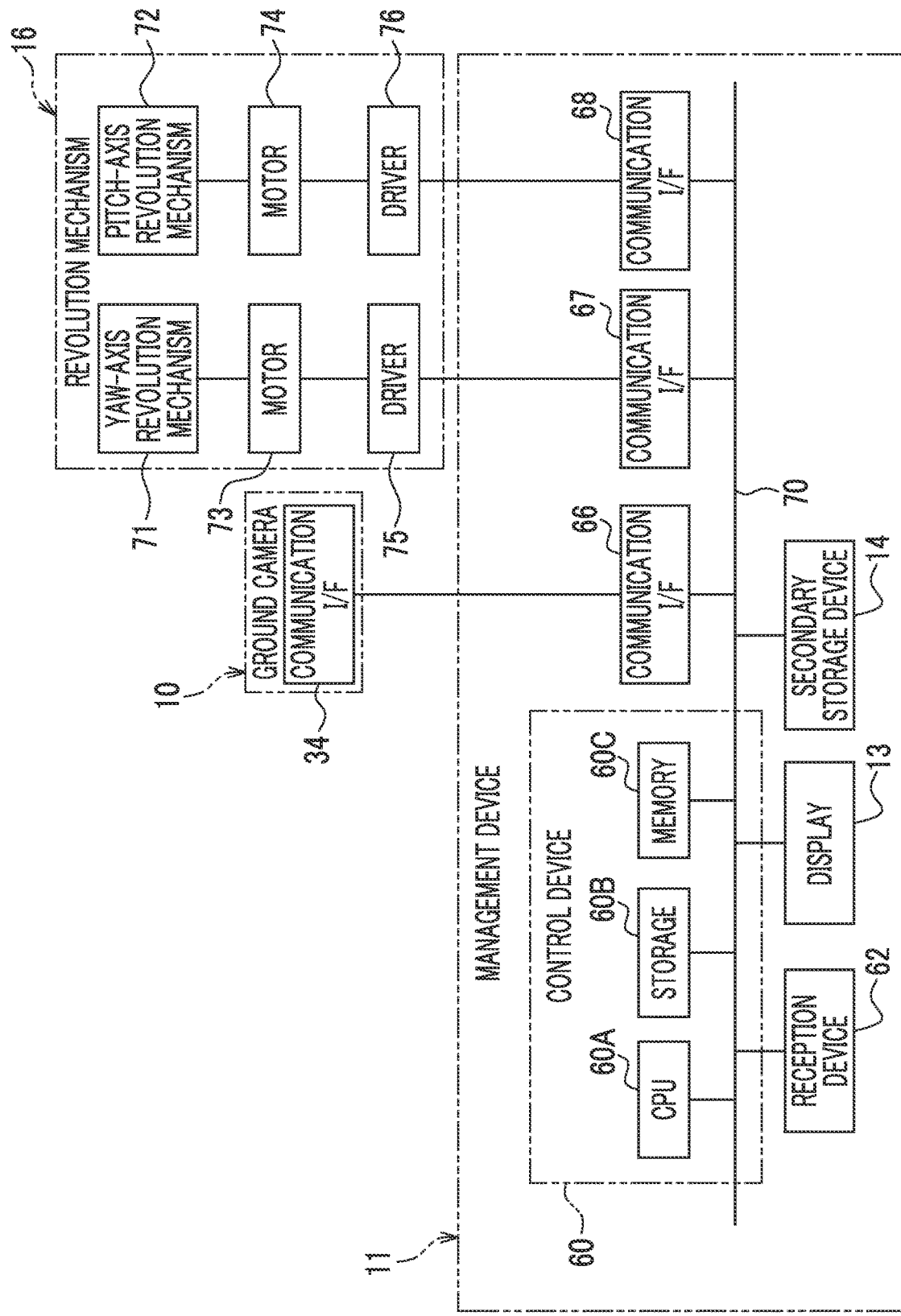
FIG. 5 is a diagram showing an example of a configuration of an electrical system of the revolution mechanism 16 and a management device 11.

FIG. 5 is a diagram showing an example of a configuration of an electrical system of the revolution mechanism 16 and the management device 11. As shown in FIG. 5 as an example, the revolution mechanism 16 comprises a yaw-axis revolution mechanism 71, a pitch-axis revolution mechanism 72, a motor 73, a motor 74, a driver 75, and a driver 76. The yaw-axis revolution mechanism 71 causes the ground camera 10 to revolve in the yaw direction. The motor 73 is driven to generate the power under the control of the driver 75. The yaw-axis revolution mechanism 71 receives the power generated by the motor 73 to cause the ground camera 10 to revolve in the yaw direction. The pitch-axis revolution mechanism 72 causes the ground camera 10 to revolve in the pitch direction. The motor 74 is driven to generate the power under the control of the driver 76. The pitch-axis revolution mechanism 72 receives the power generated by the motor 74 to cause the ground camera 10 to revolve in the pitch direction.

As shown in FIG. 5 as an example, the management device 11 comprises the display 13, a control device 60, a reception device 62, and a communication I/F 66. The control device 60 comprises a CPU 60A, a storage 60B, and a memory 60C. The CPU 60A is an example of the processor in the present invention.

Each of the reception device 62, the display 13, the secondary storage device 14, the CPU 60A, the storage 60B, the memory 60C, and the communication I/F 66 is connected to a bus 70. In the example shown in FIG. 5, one bus is illustrated as the bus 70 for convenience of illustration, but a plurality of buses may be used. The bus 70 may be a serial bus or may be a parallel bus including a data bus, an address bus, a control bus, and the like.

The memory 60C temporarily stores various kinds of information and is used as the work memory. An example of the memory 60C includes the RAM, but the technique of the present disclosure is not limited thereto. Another type of storage device may be employed. Various programs for the management device 11 (hereinafter simply referred to as "programs for management device") are stored in the storage 60B. The CPU 60A reads out the program for management device from the storage 60B and executes the readout program for management device on the memory 60C to control the entire management device 11. The program for management device includes an imaging control program according to the embodiment of the present invention.

The communication I/F 66 is, for example, a network interface. The communication I/F 66 is communicably connected to the communication I/F 34 of the ground camera 10 via the network, and controls transmission of various kinds of information to and from the ground camera 10. For example, the communication I/F 66 requests the ground camera 10 to transmit the captured image and the imaging information, and receives the captured image and the imaging information transmitted from the communication I/F 34 of the ground camera 10 in response to the request.

Further, the communication I/F 66 is communicably connected to the aerial camera 2 via the network. Alternatively, the communication I/F 66 may include a wireless communication interface that enables direct wireless communication with the aerial camera 2. The communication I/F 66 controls transmission of various types of information to and from the aerial camera 2 via the network or wireless communication. For example, the communication I/F 66 requests the aerial camera 2 to transmit the captured image and the imaging information, and receives the captured image and the imaging information transmitted from the aerial camera 2 in response to the request.

The communication I/Fs 67 and 68 are, for example, network interfaces. The communication I/F 67 is communicably connected to the driver 75 of the revolution mechanism 16 via the network. The CPU 60A controls the motor 73 via the communication I/F 67 and the driver 75 to control a revolution operation of the yaw-axis revolution mechanism 71. The communication I/F 68 is communicably connected to the driver 76 of the revolution mechanism 16 via the network. The CPU 60A controls the motor 74 via the communication I/F 68 and the driver 76 to control a revolution operation of the pitch-axis revolution mechanism 72.

The reception device 62 is, for example, a keyboard, a mouse, a touch panel, and the like, and receives various instructions from the user. The CPU 60A acquires various instructions received by the reception device 62 and operates in response to the acquired instructions. For example, in a case where the reception device 62 receives a processing content for the ground camera 10 and/or the revolution mechanism 16, the CPU 60A causes the ground camera 10 and/or the revolution mechanism 16 to operate in accordance with an instruction content received by the reception device 62.

The display 13 displays various kinds of information under the control of the CPU 60A. Examples of the various kinds of information displayed on the display 13 include contents of various instructions received by the reception device 62 and the captured image or imaging information received by the communication I/F 66.

The management device 11 comprises the secondary storage device 14. The secondary storage device 14 is, for example, a non-volatile memory and stores various kinds of information under the control of the CPU 60A. An example of the various kinds of information stored in the secondary storage device 14 includes the captured image received by the communication I/F 66. The secondary storage device 14 is an example of the memory according to the embodiment of the present invention.

As described above, the control device 60 performs the control of displaying the captured image or imaging information received by the communication I/F 66 on the display 13, and performs the control of storing the captured image or imaging information received by the communication I/F 66 in the secondary storage device 14.

Here, the control device 60 causes the display 13 to display the captured image and causes the secondary storage device 14 to store the captured image received by the communication I/F 66, but the technique of the present disclosure is not limited thereto. For example, any one of the display of the captured image on the display 13 or the storage of the captured image in the secondary storage device 14 may be performed.

<Storage of Captured Image and Imaging Information by Management Device 11>

Figure 6:
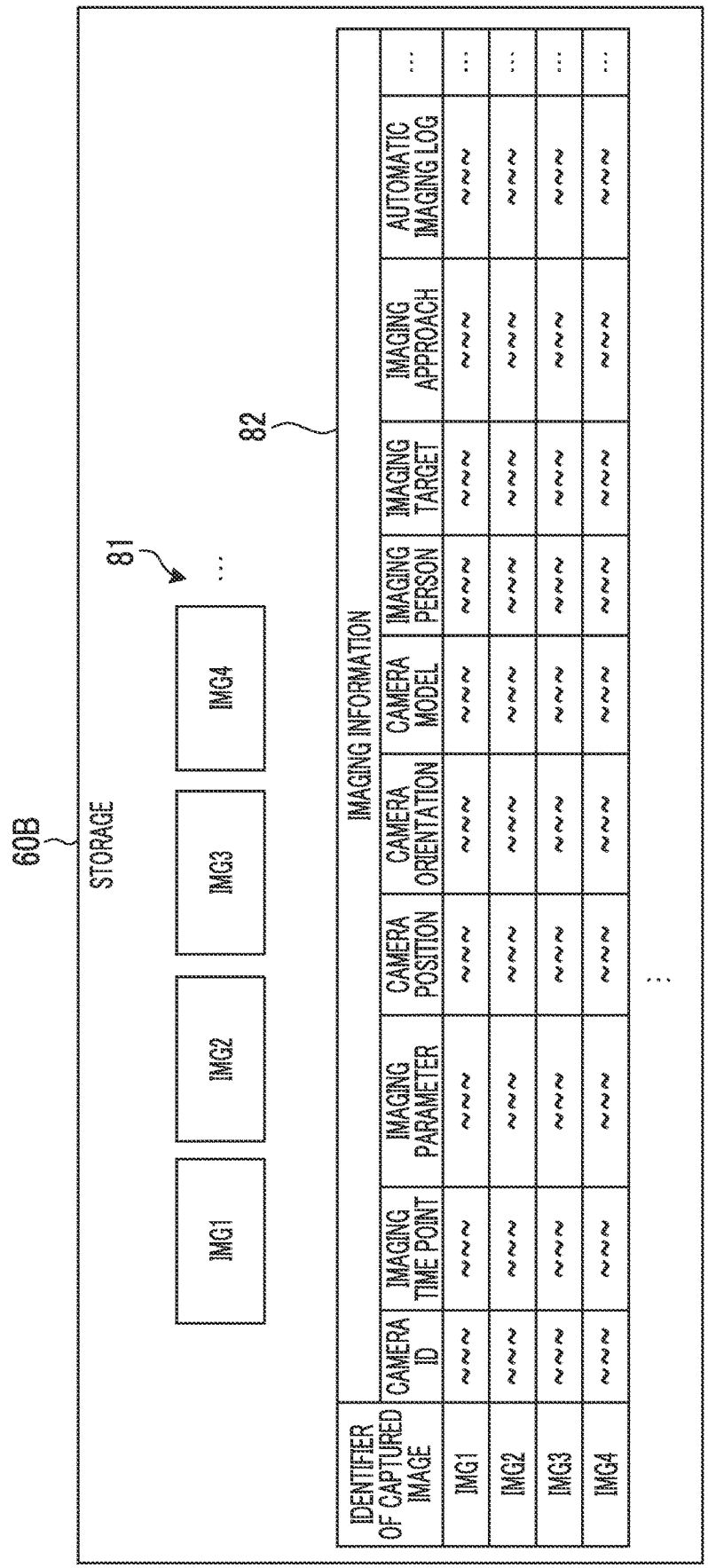
FIG. 6 is a diagram showing an example of a storage of a captured image and imaging information by the management device 11.

FIG. 6 is a diagram showing an example of the storage of the captured image and the imaging information by the management device 11. The control device 60 of the management device 11 stores, for example, a captured image 81 and an imaging information table 82 in the secondary storage device 14. The captured images 81 are captured images obtained by imaging with a plurality of cameras including the aerial camera 2 and the ground camera 10. In the example shown in FIG. 6, the captured images 81 include respective captured images with identifiers IMG1, IMG2, IMG3, IMG4, and the like.

In the imaging information table 82, the imaging information related to the capturing of the captured image is stored for each identifier of the captured image included in the captured image 81. The imaging information includes, for example, "camera ID", "imaging time point", "imaging parameter", "camera position", "camera orientation", "camera model", "imaging person", "imaging target", "imaging approach", "automatic imaging log", and the like.

The term "camera ID" is identification information (for example, serial number) of the imaging device used to capture a corresponding captured image. The term "camera ID" is a camera ID stored in an internal memory of the imaging device. The term "imaging time point" is a time point (date and time) at which the corresponding captured image is captured. The term "imaging time point" is, for example, a time point obtained by an internal clock of the imaging device.

The term "imaging parameter" is a parameter set in the imaging device, which is used to capture the corresponding captured image, at the time of capturing the captured image, such as exposure, an F number, a focus position, the focal length (angle of view), or a wide balance.

The term "camera position" is a position where the imaging device used to capture the corresponding captured image is installed at the time of capturing the captured image. The term "camera position" is, for example, a position measured by a global positioning system (GPS) unit or the like, which is provided in the imaging device. The term "camera orientation" is a direction in which the imaging device used to capture the corresponding captured image is directed at the time of capturing the captured image. The term "camera orientation" is, for example, a position measured by an electronic compass or the like, which is provided in the imaging device.

The term "camera model" is a model of the imaging device used to capture the corresponding captured image. The term "camera model" is a model name (for example, model number) stored in the internal memory of the imaging device. The term "imaging person" is a name, an identifier, or the like of a person who has captured the corresponding captured image. The term "imaging person" is, for example, set in the imaging device by a user operation on the imaging device.

The term "imaging target" is a target of the corresponding captured image capturing. For example, the term "imaging target" is a part indicated by the corresponding captured image of a certain large subject, such as imaging parts p1 to p7 described below.

The term "imaging approach" is, for example, an imaging method, such as whether the imaging is any one of the imaging from the ground or the aerial imaging. For example, the term "imaging approach" may be set in the imaging device by the user operation on the imaging device or may be automatically set depending on the model of the imaging device or the like.

The term "automatic imaging log" is, in a case where the capturing of the corresponding captured image is automatic imaging by, for example, pan•tilt•zoom (PTZ) such as the ground camera 10, a log of the automatic imaging (for example, logs of pan, tilt, zoom, and imaging).

The imaging device such as the aerial camera 2 or the ground camera 10 transmits, to the management device 11, the captured image obtained by capturing and the imaging information related to the capturing of the captured image. The management device 11 stores the received captured image and imaging information in the secondary storage device 14, as shown in FIG. 6.

The management device 11 performs the imaging control of controlling the imaging by the second imaging device (for example, the ground camera 10) based on the captured image or imaging information of a first imaging camera (for example, aerial camera 2). Further, the management device 11 may perform assist control of assisting the imaging by the second imaging device (for example, the ground camera 10) based on the captured image or imaging information of the first imaging camera (for example, aerial camera 2).

<Cooperation Imaging by Aerial Camera 2 and Ground Camera 10>

Figure 7:
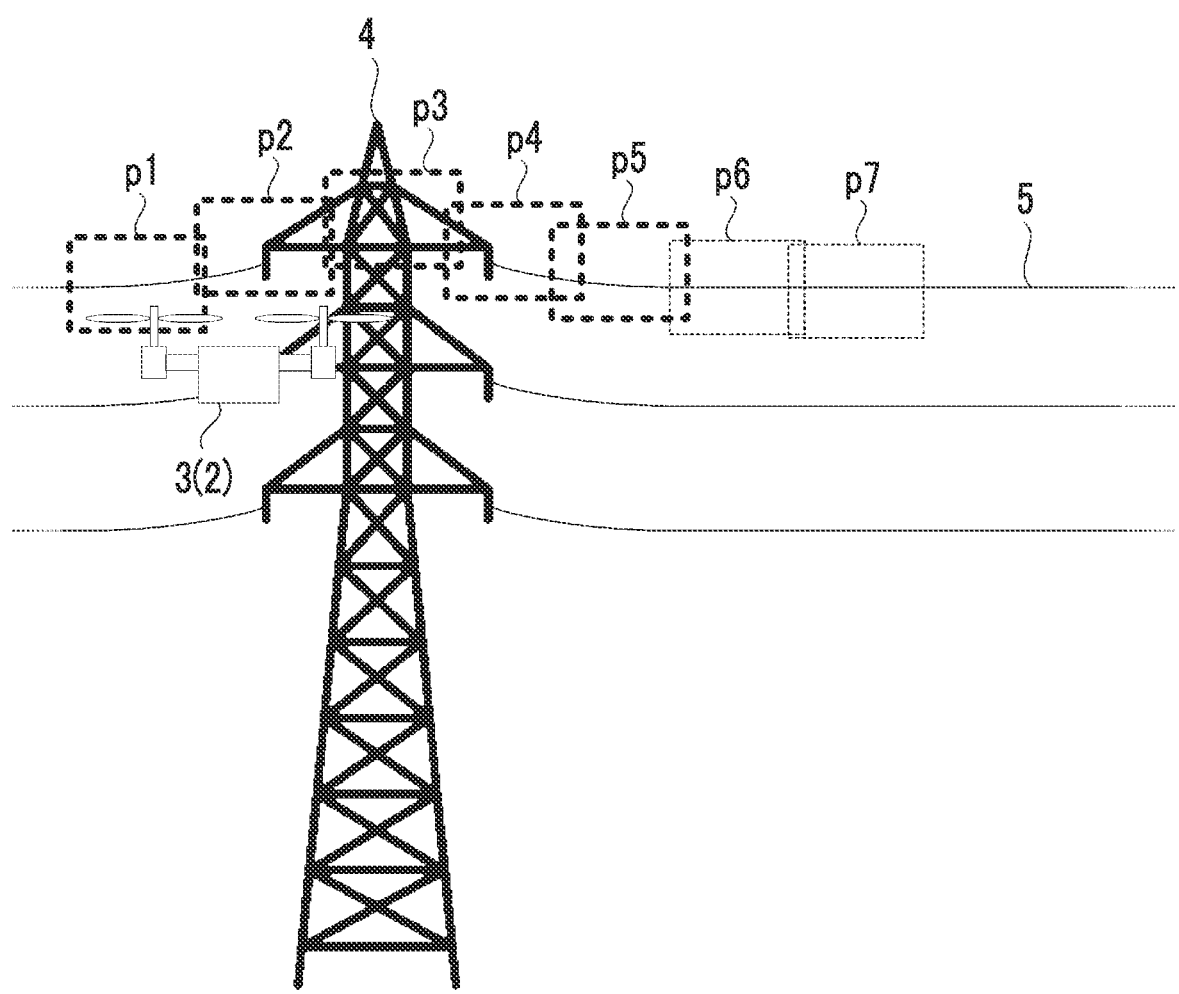
FIG. 7 is a diagram (Part 1) showing an example of cooperation imaging between an aerial camera 2 and the ground camera 10.
Figure 8:
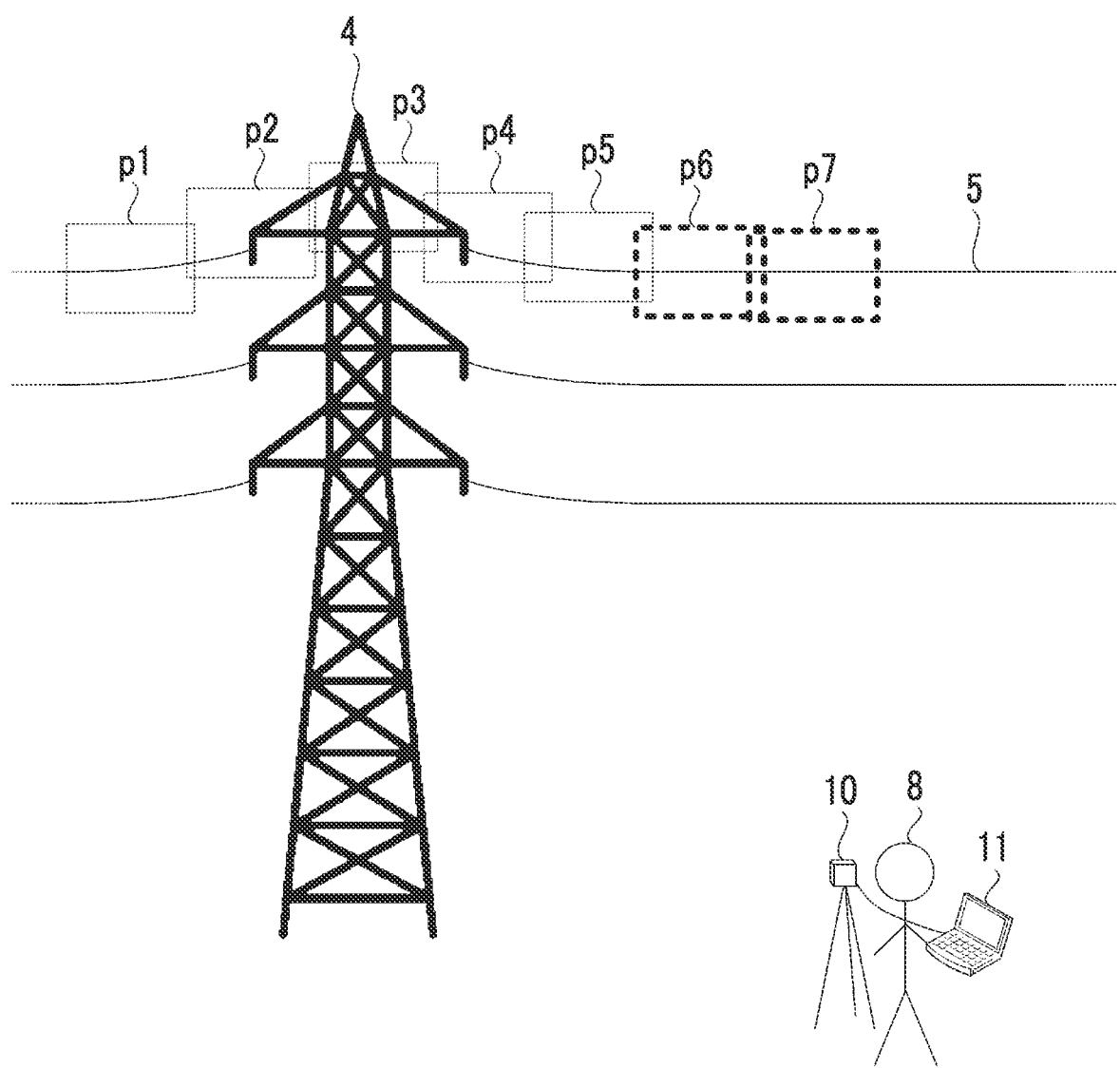
FIG. 8 is a diagram (Part 2) showing an example of the cooperation imaging between the aerial camera 2 and the ground camera 10.

FIGS. 7 and 8 are diagrams showing examples of cooperation imaging by the aerial camera 2 and the ground camera 10. Here, the cooperation imaging will be described in which a large subject is divided into a plurality of imaging parts and the divided imaging parts are shared and imaged by the aerial camera 2 and the ground camera 10. That is, the imaging with the ground camera 10 is imaging of a part different from a part imaged by the aerial camera 2 in the subject to be imaged by the aerial camera 2.

For example, as shown in FIGS. 7 and 8, a case will be described in which the cooperation imaging is performed by the aerial camera 2 and the ground camera 10 for inspection or the like with a transmission tower 4 and an electrical wire 5 extending from the transmission tower 4 as subjects. In a case where a large subject, such as the transmission tower 4 or the electrical wire 5, is imaged, even in a case where the subject is collectively imaged by the imaging device having a wide angle lens, it is not possible to obtain, due to a limit of resolution, the captured image with which a detailed abnormality of the transmission tower 4 or the electrical wire 5 can be discriminated. An example of the abnormality of the transmission tower 4 includes loosening of a bolt of the transmission tower 4 or cracking of the transmission tower 4. An example of the abnormality of the electrical wire 5 includes a precursor (damage) of rupture of the electrical wire 5.

With the division of the transmission tower 4 or the electrical wire 5 into the plurality of imaging parts and the imaging of the imaging parts, it is possible to obtain a high-resolution captured image for each part of the transmission tower 4 or the electrical wire 5 and to discriminate the detailed abnormality of the transmission tower 4 or the electrical wire 5. Further, with the cooperation imaging in which the aerial camera 2 and the ground camera 10 share and image the divided imaging parts, it is possible to perform flexible imaging such as imaging, with the aerial camera 2, of an imaging part that is difficult to be imaged by a person bringing in the ground camera 10 and imaging, with the ground camera 10, of an imaging part that is difficult to be imaged by the aerial camera 2 due to a flight prohibition area or the like.

The imaging parts p1 to p7 shown in FIGS. 7 and 8 are obtained by dividing the transmission tower 4 and the electrical wire 5, which are the subjects, into the plurality of imaging parts. The imaging parts p1 to p5 are parts where the aerial camera 2 performs the imaging. The imaging parts p6 and p7 are parts that are difficult to be imaged by the aerial camera 2 due to, for example, the flight prohibition area and are imaged by the ground camera 10.

First, as shown in FIG. 7, the imaging parts p1 to p5 are assumed to be imaged by the aerial camera 2. This imaging may be performed by controlling the aerial camera 2 from the management device 11, may be performed by controlling the aerial camera 2 from a device different from the management device 11, or may be performed autonomously by the aerial camera 2. The captured image and the imaging information obtained by imaging the imaging parts p1 to p5 are transmitted from the aerial camera 2 to the management device 11.

An imaging person 8 shown in FIG. 8 is a person who owns the ground camera 10 and the management device 11 and performs the imaging with the ground camera 10. In the example of FIG. 8, the management device 11 is a laptop computer. The management device 11 stores the captured image and the imaging information transmitted from the aerial camera 2, and performs the imaging control of controlling the imaging of the imaging parts p6 to p7 with the ground camera 10 based on the stored captured image and the imaging information.

For example, the management device 11 sets the imaging parameters in a case where the ground camera 10 images the imaging parts p6 and p7, based on the imaging parameters included in the imaging information of the imaging parts p1 to p5 with the aerial camera 2. The setting of the imaging parameter for the ground camera 10 by the management device 11 is performed, for example, by transmission of a control signal to the ground camera 10 by the management device 11 via the communication line 12.

The aerial camera 2 and the ground camera 10 are assumed to have a zoom mechanism capable of changing the angle of view (focal length). For example, the management device 11 sets the angle of view of the camera 10, based on the angle of view of the aerial camera 2 or a position of the aerial camera 2 in a case where the aerial camera 2 images the imaging parts p1 to p5 and a position of the ground camera 10. Accordingly, it is possible to capture the imaging parts p6 and p7 at a magnification close to the imaging of the imaging parts p1 to p5 with the aerial camera 2. Therefore, it is possible to efficiently perform the inspection or the like of the transmission tower 4 or the electrical wire 5 while referring to the captured images of the imaging parts p1 to p5 and the captured images of the imaging parts p6 and p7.

Here, the case has been described in which the angle of view of the ground camera 10 is set based on the angle of view of the aerial camera 2 or the like. However, the imaging parameter in the case where the imaging control of setting the imaging parameter of the ground camera 10 based on the imaging parameter of the aerial camera 2 is performed is not limited to the angle of view, and may be, for example, the exposure, the F number, the focus position, or the wide balance.

As described above, with the imaging control of controlling (for example, setting the imaging parameter) the imaging of the ground camera 10 based on the imaging information (imaging parameter) of the aerial camera 2, it is possible for the management device 11 to easily perform the cooperation imaging in which the subject is divided into the plurality of imaging parts and the divided imaging parts are shared and imaged by the aerial camera 2 and the ground camera 10.

<Assist Control by Management Device 11>

The management device 11 may perform the assist control of assisting the imaging with the ground camera 10, in addition to the imaging control of the ground camera 10.

<First Example of Assist Control by Management Device 11>

Figure 9:
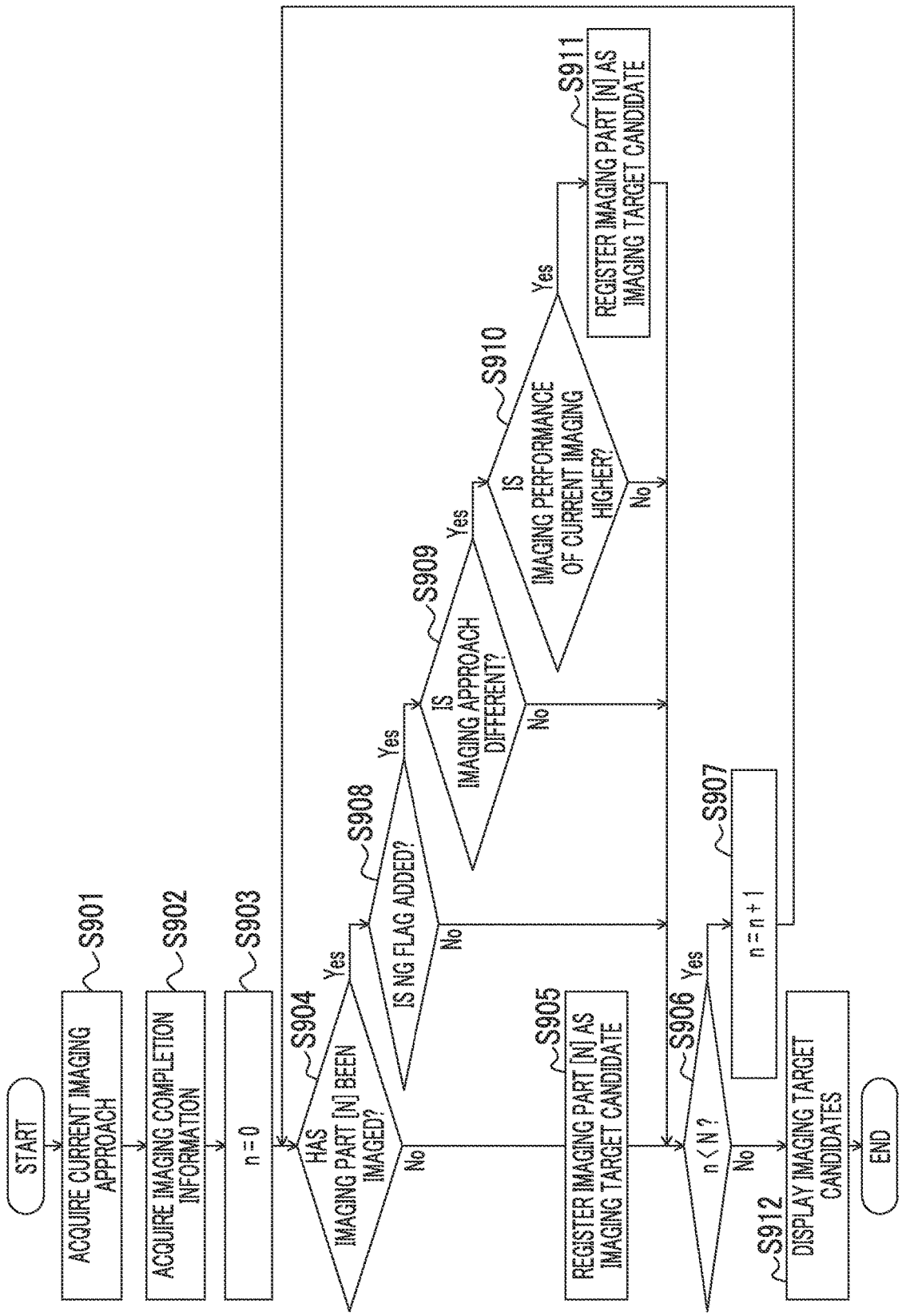
FIG. 9 is a flowchart showing a first example of assist control by the management device 11.

FIG. 9 is a flowchart showing a first example of the assist control by the management device 11. The management device 11 executes, for example, processing shown in FIG. 9 as the assist control.

First, the management device 11 acquires a current imaging approach of the ground camera 10 (step S901). The imaging approach is, for example, an imaging method, such as whether the imaging is any one of the imaging from the ground or the aerial imaging (whether or not the imaging is the aerial imaging). For example, the management device 11 acquires the current imaging approach of the ground camera 10 by an operation input from the user.

Next, the management device 11 acquires imaging completion information indicating the imaging part that has been imaged among the respective imaging parts of the subjects (for example, the transmission tower 4 and the electrical wire 5) (step S902). For example, the term "imaging target" in the imaging information table 82 shown in FIG. 6 indicates a part of the imaging target among the respective imaging parts of the subjects, and the management device 11 acquires each value of "imaging target" in the imaging information table 82 as the imaging completion information.

Next, the management device 11 sets n to 0 (initial value) (step S903). n is an index of the imaging part. For example, the subject is divided into imaging parts [0] to [N]. In this case, n is a value in a range of 0 to N.

Next, the management device 11 determines whether or not the imaging part [n] has been imaged, based on the imaging completion information acquired in step S902 (step S904). In a case where the imaging part [n] has not been imaged (step S904: No), the management device 11 registers the imaging part [n] as an imaging target candidate of the ground camera 10 (step S905).

Next, the management device 11 determines whether or not a current index n is smaller than a maximum value N (step S906). In a case where the index n is smaller than the maximum value N (step S906: Yes), the management device 11 increments n (step S907), and the processing returns to step S904.

In step S904, in a case where the imaging part [n] has been imaged (step S904: Yes), the management device 11 determines whether or not an NG flag is added to the captured image of the imaging part [n] (step S908). The NG flag is flag information indicating that the captured image does not satisfy a predetermined condition. For example, the NG flag is added in a case where the captured image is not in proper exposure, is blurred, is out of focus, or has unintended reflection of a bird or the like. For example, the NG flag may be added by the user of the management device 11 by viewing the captured image, or may be automatically added by the management device 11 through image analysis or the like.

In step S908, in a case where the NG flag is not added to the captured image (step S908: No), the management device 11 does not register the imaging part [n] as the imaging target candidate, and the processing proceeds to step S906. In a case where the NG flag is added to the captured image (step S908: Yes), the management device 11 determines whether or not the current imaging approach of the ground cameras 10 acquired in step S901 is different from the imaging approach in the past for the imaging part [n], which is indicated by the imaging information table 82 (step S909).

In step S909, in a case where the imaging approaches are the same (step S909: No), the management device 11 does not register the imaging part [n] as the imaging target candidate, and the processing proceeds to step S906. In a case where the imaging approaches are different (step S909: Yes), the management device 11 determines whether or not imaging performance of current imaging with the ground camera 10 is higher than imaging performance of imaging in the past of the imaging part [n] (step S910). The imaging performance is, for example, the resolution, the F number, high-sensitivity performance, or telephoto performance (angle of view).

The imaging performance of each imaging device is discriminated, for example, by the model of each device. For example, the management device 11 stores performance information indicating the imaging performance for each model of the imaging device, and the management device 11 can discriminate the imaging performance based on the performance information and the model name included in the imaging information table 82. Alternatively, the imaging information table 82 may include the performance information indicating the imaging performance, and the management device 11 may refer to the imaging information table 82 to discriminate the imaging performance.

In step S910, in a case where the imaging performance is not high (step S910: No), the management device 11 does not register the imaging part [n] as the imaging target candidate, and the processing proceeds to step S906. In a case where the imaging performance is high (step S910: Yes), the management device 11 registers the imaging part [n] as the imaging target candidate of the ground camera 10 (step S911), and the processing proceeds to step S906.

In step S906, in a case where the index n is not smaller than the maximum value N (step S906: No), the management device 11 displays the imaging target candidates registered in steps S905 and S911 to the imaging person using the ground camera 10 (step S912), and ends the series of pieces of processing. The imaging target candidates in step S912 are displayed by the display 13, which is provided in the management device 11. Alternatively, with the control of the display 43B of the ground camera 10 by the management device 11, the imaging target candidates in step S912 may be displayed.

<Display of Imaging Target Candidate of Ground Camera 10 by Management Device 11>

Figure 10:
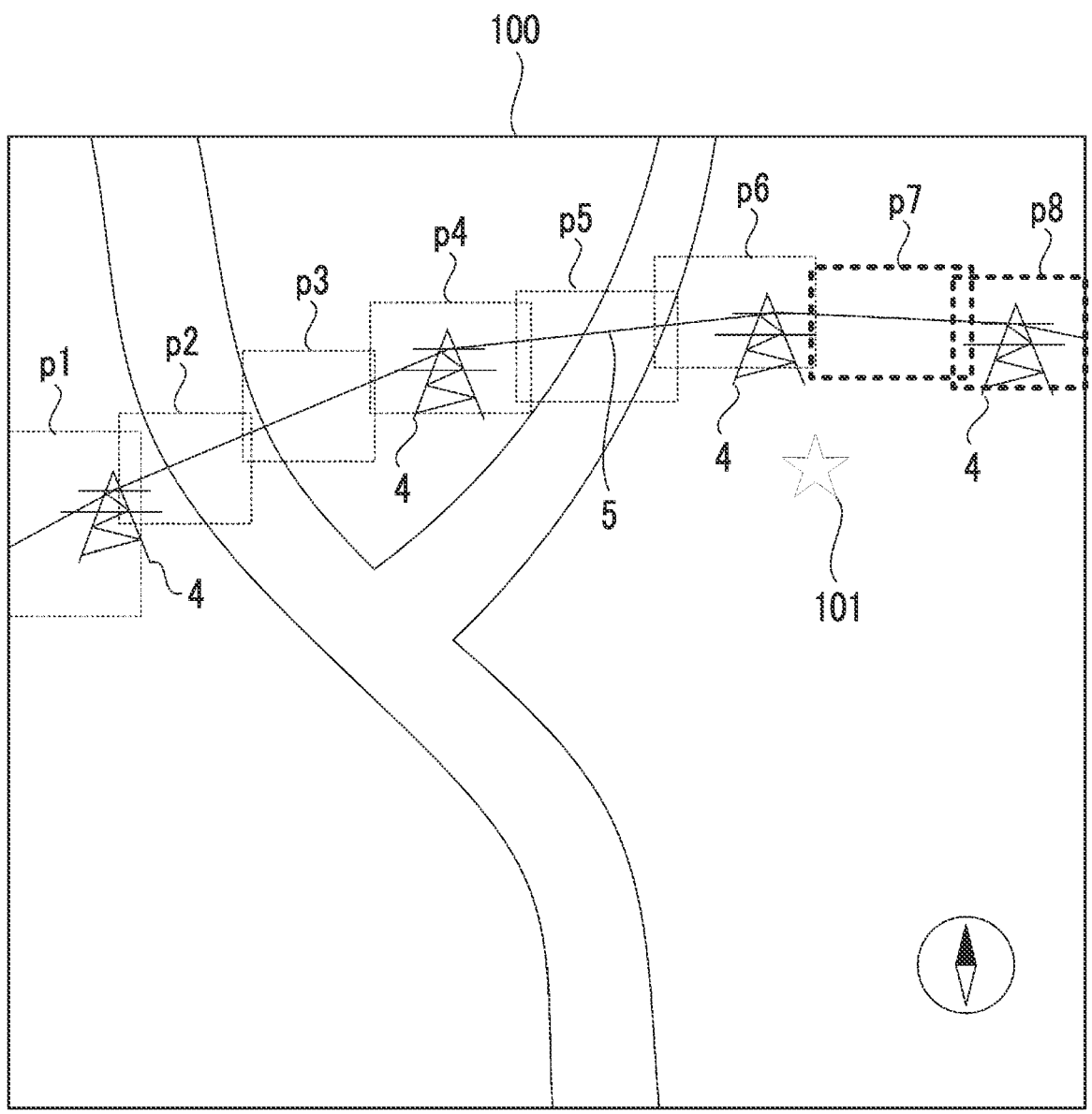
FIG. 10 is a diagram showing an example of display, by the management device 11, of imaging target candidates of the ground camera 10.

FIG. 10 is a diagram showing an example of the display of the imaging target candidates of the ground camera 10 by the management device 11. In step S912 of FIG. 9, the management device 11 displays an imaging map 100 shown in FIG. 10 to the imaging person 8 using, for example, the ground camera 10. The imaging map 100 is a two-dimensional map of an area in which the transmission tower 4 and the electrical wire 5, which are the subjects, are laid.

The imaging map 100 shows a plurality of transmission towers 4 and electrical wires 5. Further, the imaging map 100 also shows imaging parts p1 to p8. As described above, the imaging part is set in advance by, for example, designating each portion of the imaging map 100. A current location mark 101 is current positions of the management device 11 and the ground camera 10. For example, the management device 11 displays, in a superimposed manner, the current location mark 101 on the imaging map 100 based on position information acquired by at least any one of the management device 11 or the ground camera 10 using a GPS unit or the like.

For example, in steps S905 and S911 of FIG. 9, the imaging parts p7 and p8, among the imaging parts p1 to p8, are assumed to be registered as the imaging target candidates. In this case, in step S912 of FIG. 9, the management device 11 displays, in a highlighted manner, the imaging parts p7 and p8, which are the imaging target candidates, in a different aspect from the other imaging parts p1 to p6. Accordingly, the imaging person 8 can easily recognize that the imaging parts required to be imaged by the imaging person 8 with the ground camera 10 are the imaging parts p7 and p8, and can image the imaging parts p7 and p8 with the ground camera 10.

As described above, the management device 11 may perform control of selecting the part of the imaging target of the ground camera 10, from among the respective imaging parts of the subjects set in advance, as the assist control of assisting the imaging with the ground camera 10. Specifically, the imaging information table 82 includes the imaging completion information indicating the part imaged by the aerial camera 2 among the respective imaging parts of the subjects, and the management device 11 performs the control of selecting the part of the imaging target of the ground camera 10 based on the imaging completion information.

Accordingly, since the imaging person 8 can easily recognize the imaging part required to be imaged by the imaging person 8 with the ground camera 10, it is possible to easily perform the cooperation imaging in which the subject is divided into the plurality of imaging parts and the divided imaging parts are shared and imaged by the aerial camera 2 and the ground camera 10.

<Second Example of Assist Control by Management Device 11>

Figure 11:
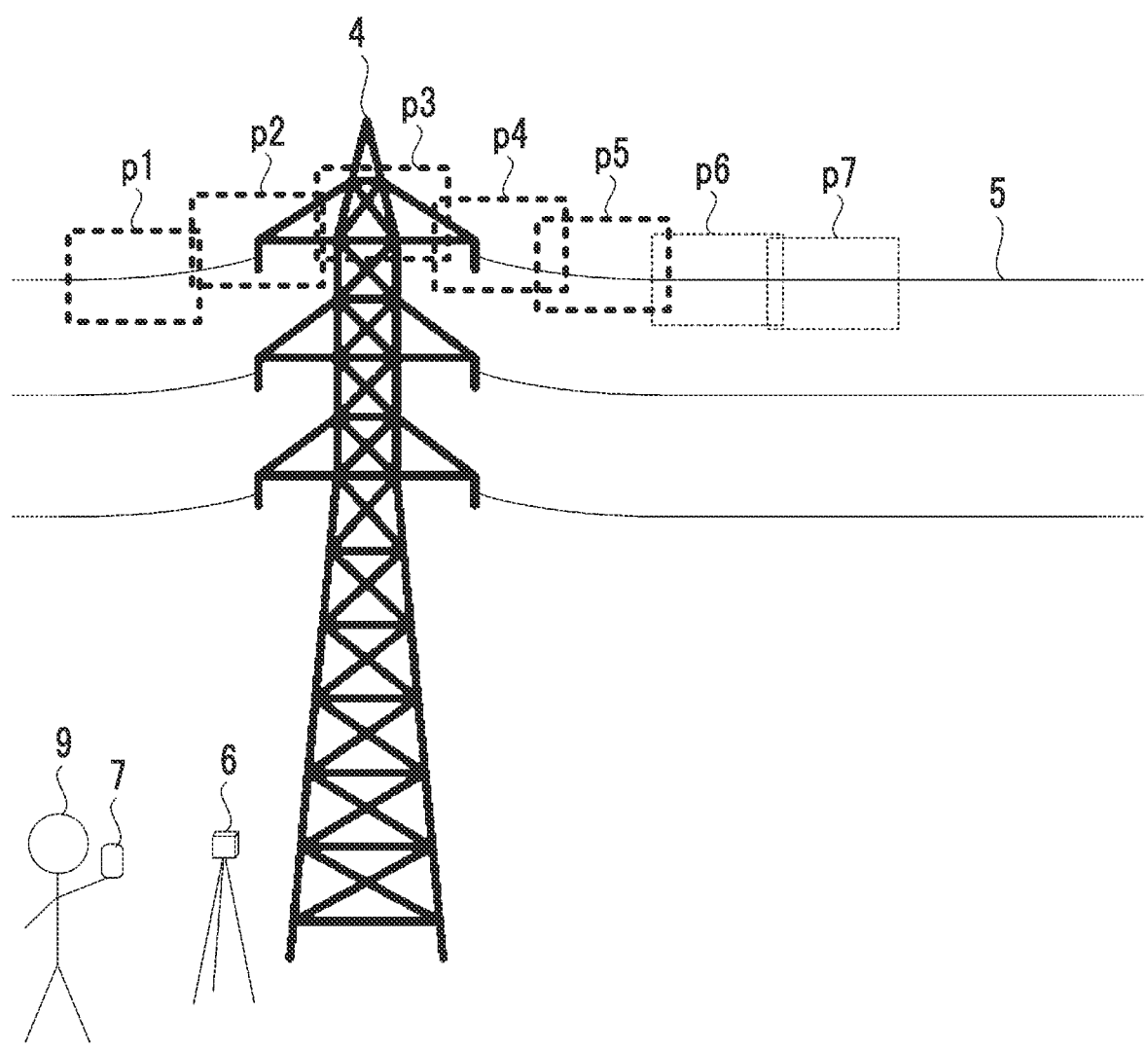
FIG. 11 is a diagram for describing a second example of the assist control by the management device 11.

FIG. 11 is a diagram for describing a second example of the assist control by the management device 11. Here, it is assumed that the first imaging device is not the aerial camera 2, but a ground camera 6 different from the ground camera 10. It is assumed that an imaging person 9 uses the ground camera 6 to image the imaging parts p1 to p5 of the transmission tower 4 and the electrical wires 5 before the imaging with the ground camera 10. In this case, the imaging person 9 images the ground camera 6 by using a smartphone 7 capable of imaging the ground camera 6 at a short distance.

The ground camera 6 transmits, to the management device 11, the captured image obtained by capturing and the imaging information including the position information of the ground camera 6 acquired by the GPS unit or the like, which is provided in the ground camera 6, as the camera position. Further, the smartphone 7 transmits, to the management device 11, the position information of the smartphone 7 acquired by the GPS unit or the like, which is provided in the smartphone 7.

The smartphone 7 may further transmit, to the management device 11, the captured image obtained by capturing the ground camera 6. The management device 11 may store the captured image as an image indicating a state at the time of the imaging by the ground camera 6, by including the captured image in the imaging information received from the ground camera 6.

<Processing of Management Device 11 in Second Example of Assist Control>

Figure 12:
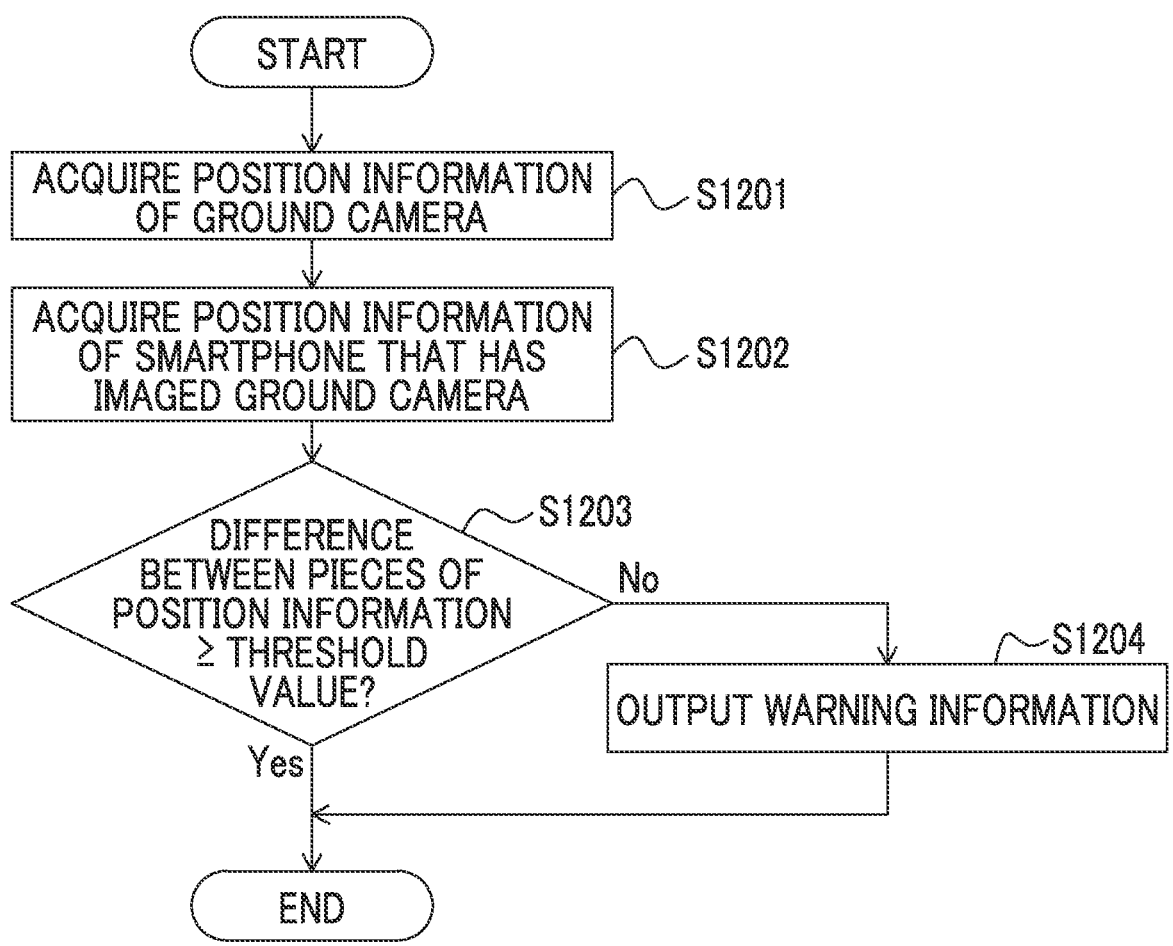
FIG. 12 is a flowchart showing an example of processing of the management device 11 in the second example of the assist control.

FIG. 12 is a flowchart showing an example of processing of the management device 11 in the second example of the assist control. The management device 11 executes, for example, the processing shown in FIG. 12 as the second example of the assist control. The processing shown in FIG. 12 is performed, for example, in a case where the imaging with the ground camera 10 is controlled based on the imaging information of the ground camera 6. Alternatively, the processing shown in FIG. 12 may be performed in a case where the management device 11 receives the imaging information (including the position information of the ground camera 6) transmitted by the ground camera 6 and the position information of the smartphone 7 transmitted by the smartphone 7.

First, the management device 11 acquires the position information of the ground camera 6 received from the ground camera 6 (step S1201). Next, the management device 11 acquires the position information of the smartphone 7 that has imaged the ground camera 6, received from the smartphone 7 (step S1202).

Next, the management device 11 determines whether or not a difference between the pieces of position information acquired in steps S1201 and S1202 is equal to or larger than a threshold value (step S1203). Specifically, the management device 11 determines whether or not a distance between a position of the ground camera 6 indicated by the position information of the ground camera 6 and a position of the smartphone 7 indicated by the position information of the smartphone 7 is equal to or larger than the threshold value. The threshold value is set in advance and is, for example, about 10 [m].

In step S1203, in a case where the difference is not equal to or larger than the threshold value (step S1203: No), the management device 11 ends the series of pieces of processing. In a case where the difference is equal to or larger than the threshold value (step S1203: Yes), the management device 11 outputs warning information to the user of the management device 11 (step S1204) and ends the series of pieces of processing.

As an example of the warning information, for example, in a case where a list of the captured images captured by the first imaging device including the ground camera 6 are displayed, the management device 11 displays a warning indicating that there is a problem in the position information for the captured image having a large difference in the position information. It should be noted that the output of the warning information is not limited thereto, and can be performed by various methods.

As described above, the imaging information from the ground camera 6 (first imaging device) may include the position information of the ground camera 6 at the time of the imaging by the ground camera 6, and the management device 11 may perform the control (control of issuing warning in a case where the difference is large) based on the difference between the position information of the smartphone 7 obtained by the smartphone 7 (third imaging device) that has imaged the ground camera 6, which images the subject (the transmission tower 4 or the electrical wire 5), and the position information of the ground camera 6.

Accordingly, for example, in a case where the position information of the ground camera 6 is not accurate due to a failure of the GPS unit or the like, which is provided in the imaging part p6, it is possible to take measures, such as outputting warning information. Therefore, it is possible to suppress difficulty in performing the cooperation imaging due to inaccurate position information of the ground camera 6.

Although the smartphone 7 has been described as an example of the third imaging device that can perform the imaging with the ground camera 6 at a short distance, the third imaging device is not limited to the smartphone 7 and may be a tablet terminal, a laptop computer, a compact digital camera, or the like. Further, the third imaging device may be the management device 11 provided with an imaging function.

Further, the case has been described in which the position information of the ground camera 6 is acquired by the GPS unit or the like of the ground camera 6. However, in a case where the ground camera 6 is mounted in a moving object such as an automobile, the ground camera 6 may acquire the position information acquired by a GPS unit or the like of the moving object and may transmit, to the management device 11, the acquired position information as the position information of the ground camera 6.

<Another Example of Assist Control>

The assist control by the management device 11 is not limited to the above example, and can be various pieces of control based on the captured image or the imaging information. For example, the management device 11 may perform the assist control of displaying, at the time of the imaging by the second imaging device (ground camera 10), at least one of the captured image or the imaging information, which is obtained by the imaging by the first imaging device (aerial camera 2 or ground camera 6), to the imaging person (for example, the imaging person 8) using the second imaging device. Accordingly, the imaging person using the second imaging device can perform the imaging with reference to the captured image or the imaging information, which is an imaging result of another imaging part.

<Automatic Imaging Control by Management Device 11>

The management device 11 may perform automatic imaging control of controlling the automatic imaging by the ground camera 10, in addition to the imaging control of the ground camera 10 described above.

Figure 13:
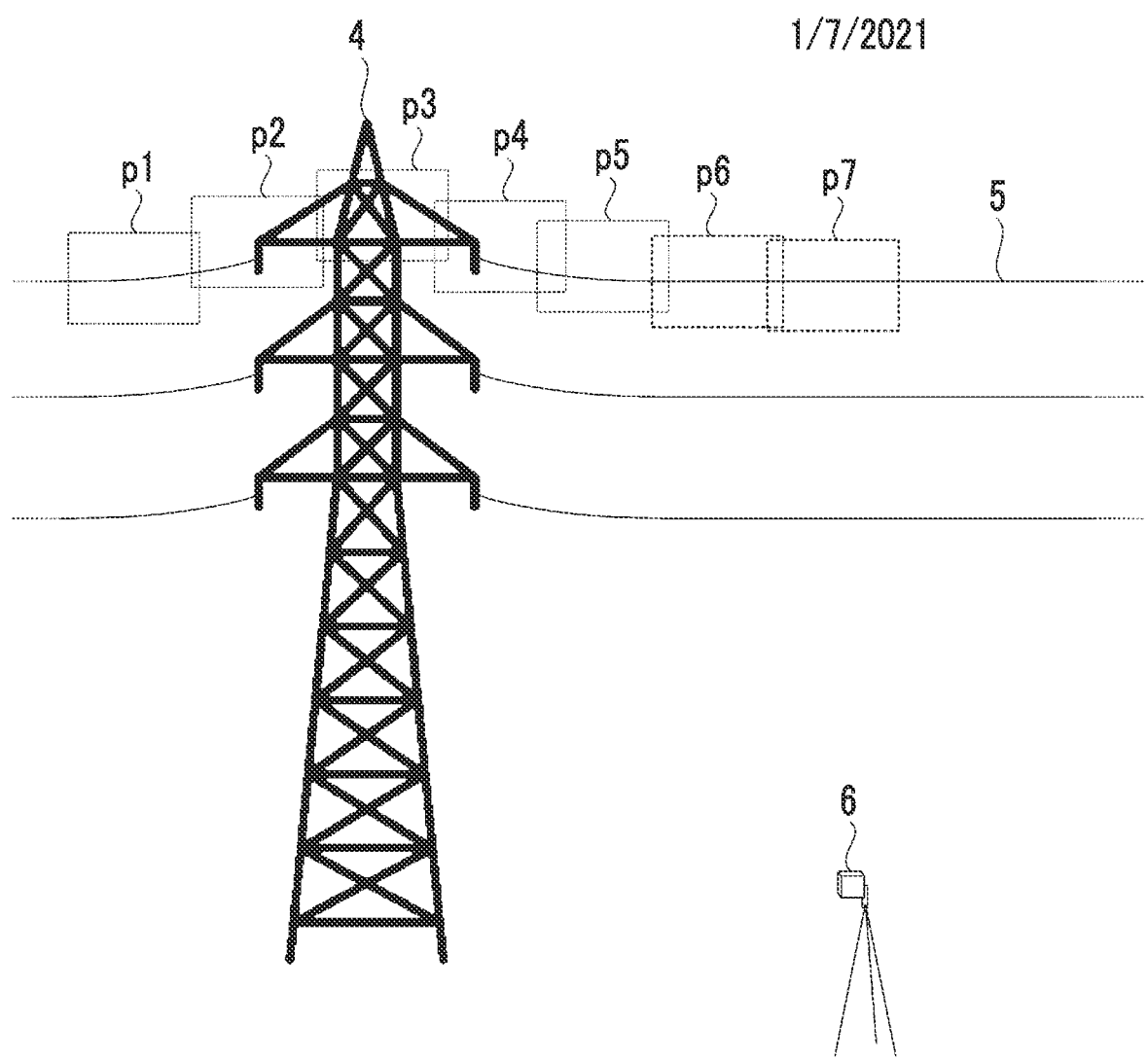
FIG. 13 is a diagram (Part 1) showing an example of automatic imaging control by the management device 11.
Figure 14:
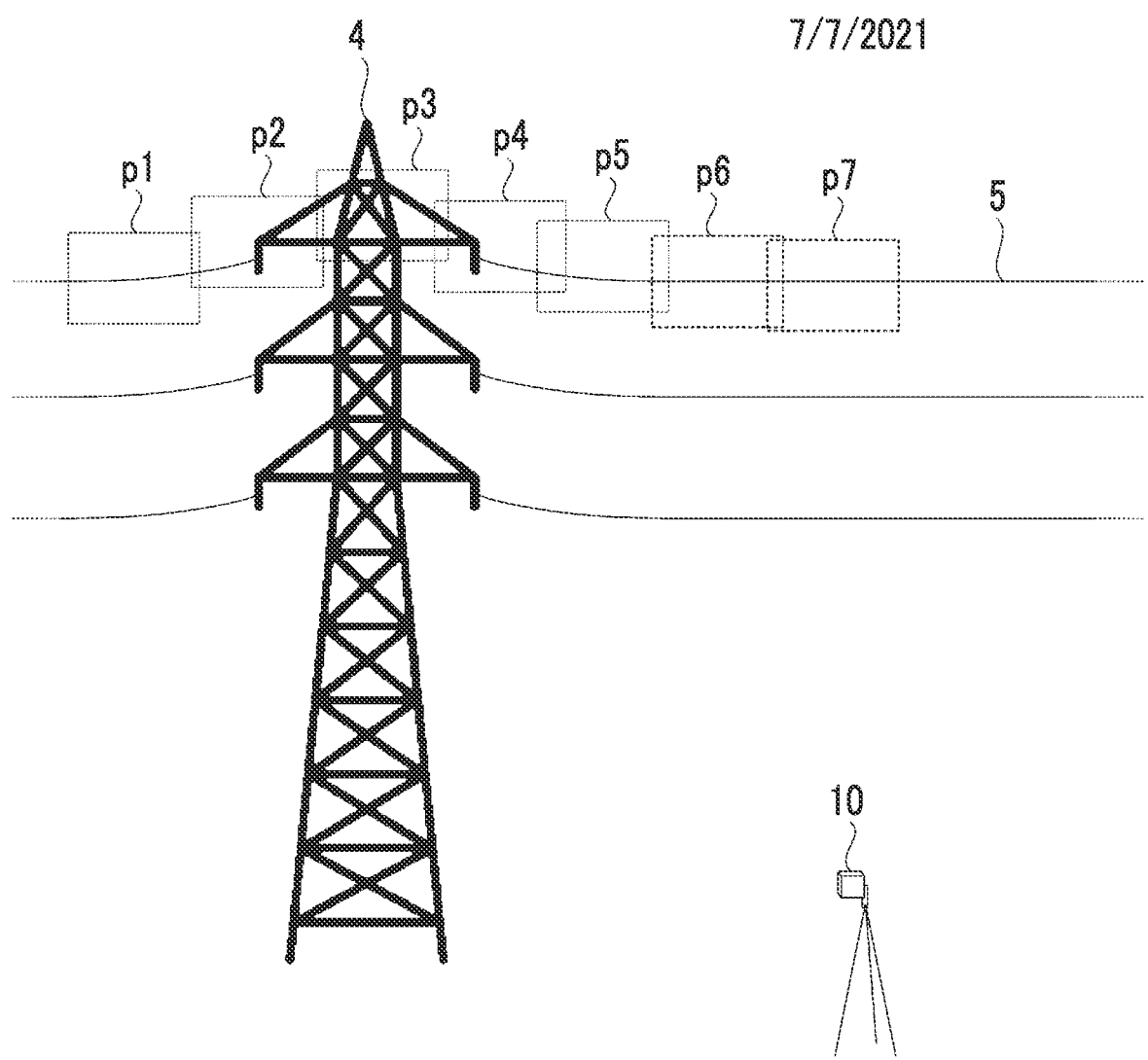
FIG. 14 is a diagram (Part 2) showing an example of the automatic imaging control by the management device 11.

FIGS. 13 and 14 are diagrams showing examples of the automatic imaging control by the management device 11. Here, it is also assumed that the first imaging device is not the aerial camera 2, but the ground camera 6 different from the ground camera 10. The ground camera 6 and the ground camera 10 can perform the automatic imaging on a plurality of parts of the subject. The automatic imaging is a function of performing imaging while sequentially switching the imaging range automatically by the pan and tilt or a zoom function of the revolution mechanism 16 to automatically image the plurality of parts of the subject.

For example, it is assumed that the ground camera 6 executes the automatic imaging of the imaging parts p1 to p7 on Jan. 7, 2021. In this case, the ground camera 6 transmits, to the management device 11, the automatic imaging log, which is a log of the executed automatic imaging, as the imaging information together with the captured image obtained by the automatic imaging.

The automatic imaging log is information indicating, for example, a procedure such as imaging of the imaging part p1, changing of the imaging range using the pan and tilt, imaging of the imaging part p2, changing of the imaging range using the pan and tilt, imaging of the imaging part p3, and the like, and includes a direction or an amount of the pan or tilt at the time of changing the imaging range. As the parameters for imaging the first imaging part p1, for example, an orientation of the ground camera 6 (acquired by the electronic compass of the ground camera 6), a driving parameter of the revolution mechanism 16, a zoom position of the ground camera 6, and the like may be included in the automatic imaging log.

Next, it is assumed that the automatic imaging is executed on the imaging parts p1 to p7 by the ground camera 10 on Jul. 7, 2021. In this case, the management device 11 controls the automatic imaging of the ground camera 10 based on the automatic imaging log of the ground camera 6 such that the same imaging as the automatic imaging performed on Jan. 7, 2021, is executed. Accordingly, it is possible to perform the automatic imaging on the imaging parts p1 to p7 by the ground camera 10.

As described above, the ground camera 6 can perform the automatic imaging on the plurality of parts of the subject, and may transmit, to the management device 11, the imaging information including the automatic imaging log. The management device 11 may perform the automatic imaging control of controlling the automatic imaging of the same plurality of parts by the ground camera 10 based on the automatic imaging log. Accordingly, it is possible to obtain each captured image obtained by capturing the imaging parts p1 to p7 at different time points (for example, Jan. 7, 2021, and Jul. 7, 2021), and to efficiently observe a change over time of the subject.

The case has been described in which the automatic imaging control of the ground camera 10 is performed based on the automatic imaging log of the ground camera 6. However, the automatic imaging control of the ground camera 6 may be performed based on the automatic imaging log of the ground camera 6. That is, in the examples of FIGS. 13 and 14, even on Jul. 7, 2021, in FIG. 14, the imaging parts p1 to p7 may be imaged by the ground camera 6 in the same manner as on Jan. 7, 2021, of FIG. 13, and the automatic imaging control of the ground camera 6 on Jan. 7, 2021, may be performed based on the automatic imaging log of the ground camera 6 on Jan. 7, 2021.

Embodiment 2

Parts of Embodiment 2 different from Embodiment 1 will be described. In Embodiment 2, a case will be described in which the second imaging device (for example, the ground camera 10) performs the imaging of a surface different from a surface imaged by the first imaging device in the subject to be imaged by the first imaging device (for example, the aerial camera 2). The surface to be imaged is synonymous with a direction in which the imaging is performed. For example, a case where a spherical object is used as the subject and different surfaces of the spherical object are imaged by the first imaging device and the second imaging device includes a case where the spherical object is imaged from a certain direction by the first imaging device and the spherical object is imaged from another direction (for example, an opposite direction) by the second imaging device.

<Imaging with Aerial Camera 2 and Ground Camera 10 of Embodiment 2>

Figure 15:
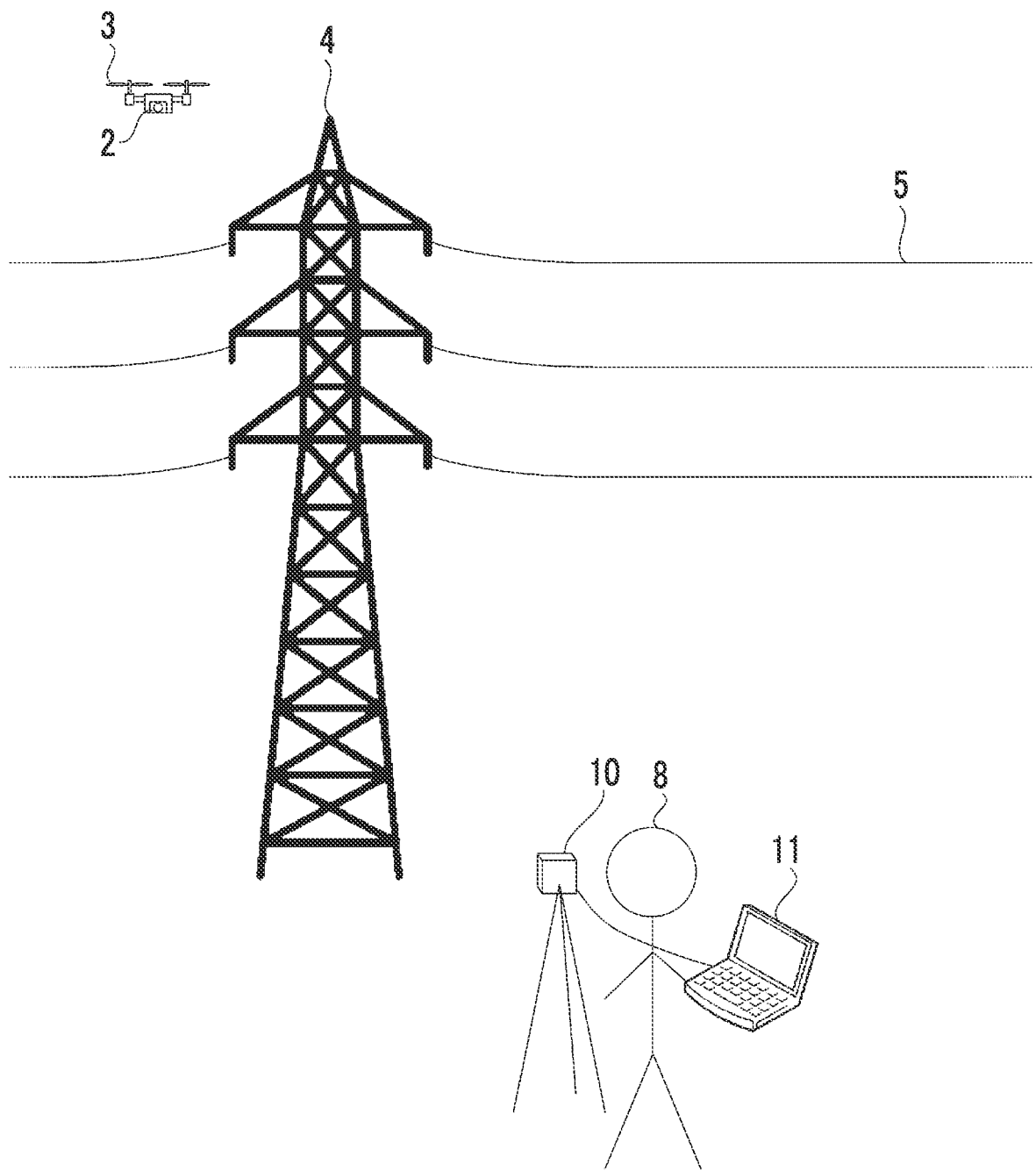
FIG. 15 is a diagram showing an example of imaging with the aerial camera 2 and the ground camera 10 of Embodiment 2.

FIG. 15 is a diagram showing an example of the imaging with the aerial camera 2 and the ground camera 10 of Embodiment 2. For example, the same imaging target part (near top of the transmission tower 4) is imaged in different directions by the aerial camera 2 and the ground camera 10.

For example, it is assumed that the flying object 3 mounted with the aerial camera 2 is located on a north side (back side of FIG. 15) of the transmission tower 4 and the imaging person 8 who owns the ground camera 10 is located on a south side (front side of FIG. 15) of the transmission tower 4. In this case, the aerial camera 2 images a surface of the top of the transmission tower 4 on the north side, and the ground camera 10 images a surface of the top of the transmission tower 4 on the south side.

In such a case, the aerial camera 2 transmits, to the management device 11, the captured image obtained by the imaging of the transmission tower 4 and the imaging information including information indicating the position and orientation of the aerial camera 2 at the time of capturing the captured image. The position and orientation of the aerial camera 2 are acquired by, for example, the GPS unit or the electronic compass, which is provided in the aerial camera 2 or the flying object 3.

The management device 11 controls the orientation of the imaging with the ground camera 10, as the imaging control of the ground camera 10, based on the imaging information of the aerial camera 2 (the position and orientation of the aerial camera 2) and the position and orientation of the ground camera 10. The position and orientation of the ground camera 10 are acquired by, for example, the GPS unit or the electronic compass, which is provided in the ground camera 10. The orientation of the imaging with the ground camera 10 can be controlled by, for example, the drive of the revolution mechanism 16.

<Control of Orientation of Imaging with Ground Camera 10>

Figure 16:
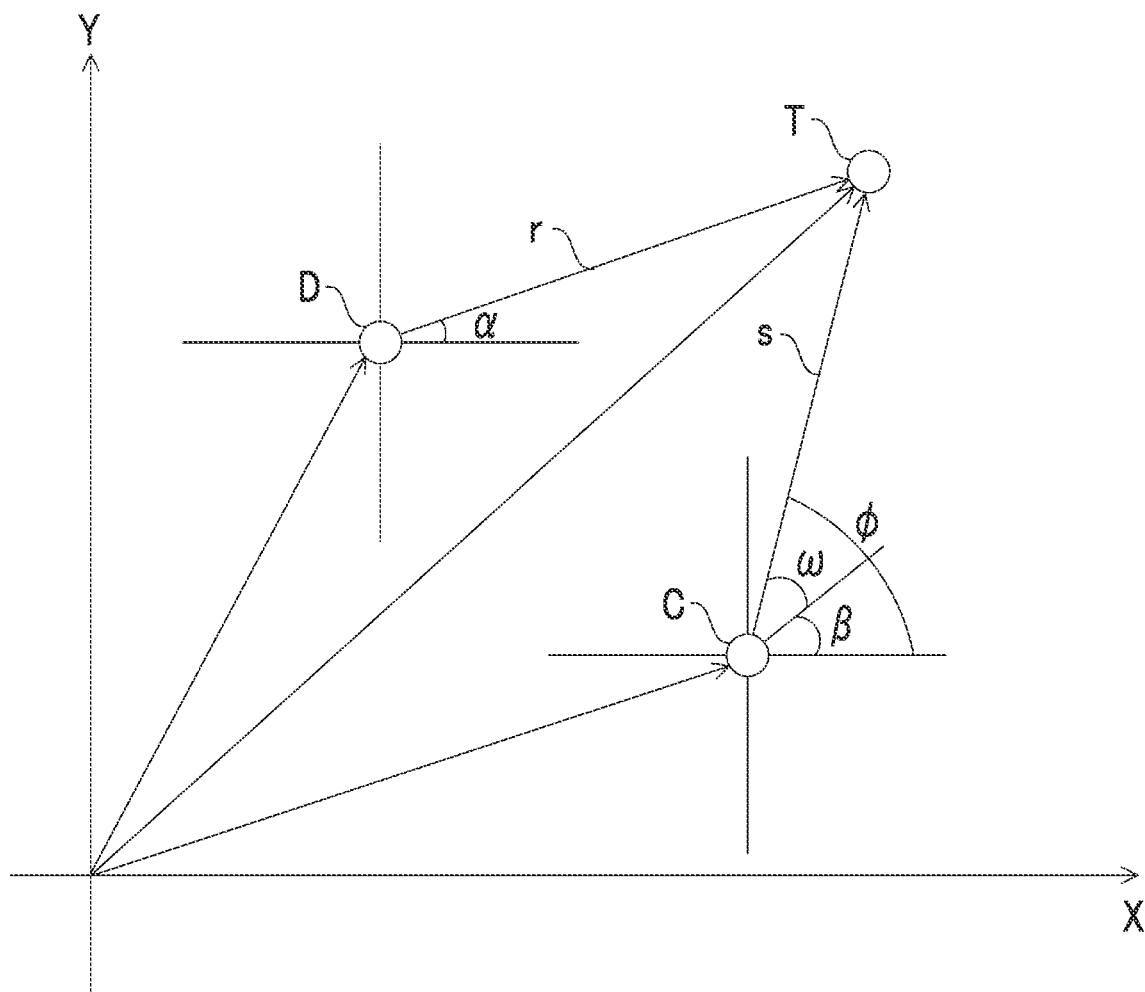
FIG. 16 is a diagram (Part 1) for describing an example of control of an orientation of the imaging with the ground camera 10.
Figure 17:
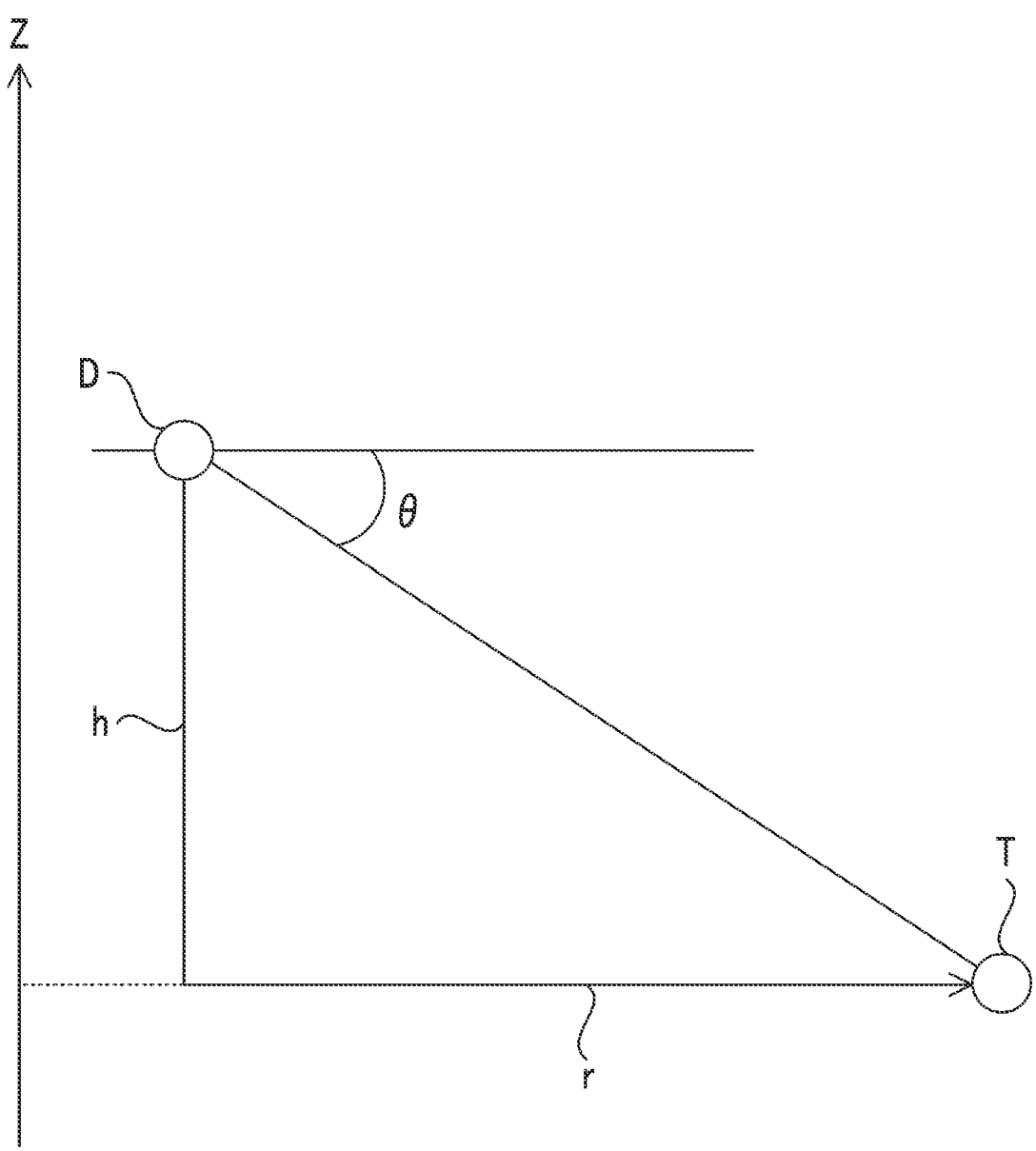
FIG. 17 is a diagram (Part 2) for describing an example of the control of the orientation of the imaging with the ground camera 10.

FIGS. 16 and 17 are diagrams for describing examples of the control of the orientation of the imaging with the ground camera 10. A vertical direction (direction of gravitational force) is set as a Z direction, and respective directions orthogonal to the Z direction and orthogonal to each other are set as an X direction and a Y direction.

FIG. 16 shows a positional relationship between the aerial camera 2 and the imaging target part (for example, near the top of the transmission tower 4) as viewed from the Z direction. FIG. 17 shows a positional relationship between the aerial camera 2 and an imaging target part on a perpendicular plane including respective positions (D, T) of the aerial camera 2 and the imaging target part. In this example, it is assumed that a tilt direction of the ground camera 10 matches the imaging target part, and the imaging target part can be imaged by the ground camera 10 in a case where a pan direction of the ground camera 10 is controlled.

C, D, β, α, h, and θ are pieces of input information that can be acquired by the management device 11.

C is a position of the ground camera 10 and is acquired by the GPS unit or the like, which is provided in the ground camera 10 or the management device 11. D is a position of the aerial camera 2 and is acquired by the GPS unit or the like, which is provided in the aerial camera 2 or the flying object 3.

β is a current orientation of the ground camera 10 with respect to a specific direction (X direction), and is acquired by the electronic compass or the like, which is provided in the ground camera 10. α is an orientation of the aerial camera 2 with respect to the specific direction (X direction) at the time of imaging the imaging target part with the aerial camera 2, and is acquired by the electronic compass or the like, which is provided in the aerial camera 2 or the flying object 3.

h is a height of the aerial camera 2 from the ground, and is acquired by the GPS unit or the like, which is provided in the aerial camera 2 or the flying object 3. θ is a tilt angle with respect to a horizontal direction in a case where the aerial camera 2 images the imaging target part, and is acquired by an angular velocity sensor or the like, which is provided in the aerial camera 2 or the flying object 3. Further, in a case where the aerial camera 2 has a tilt mechanism, θ may be acquired from a drive state or the like of the tilt mechanism of the aerial camera 2.

The management device 11 calculates ω as output information based on the above-described input information and the following Equation (1). ω is a pan angle for imaging the same imaging target part as the aerial camera 2 by the ground camera 10 from a current state.

$D+r=T$ $Dx+r\cdot\cos\alpha=Tx\ Dy+r\sin\alpha=Ty$ $C+s=T$ $s=(sx,sy)=T-C=(Tx-Cx,Ty-Cy)$ $s=|s|=(Sx^2+Sy^2)^{0.5}$ $\tan\varphi=sy/sx$ $\varphi=\text{Arctan}(sy/sx)$ $\omega=\varphi-\beta$ (1)

With the drive of the revolution mechanism 16 by the management device 11 based on the calculated ω to cause the ground camera 10 to pan by ω, the ground camera 10 can be directed toward the same imaging target part as the aerial camera 2. Therefore, the imaging person 8, who performs the imaging using the ground camera 10, can image the same imaging target part as the aerial camera 2 with the ground camera 10 without considering the orientation of the ground camera 10. Further, the management device 11 may perform control of causing the ground camera 10 to execute the imaging after the ground camera 10 is directed toward the imaging target part.

<Another Example of Control of Orientation of Imaging with Ground Camera 10>

Figure 18:
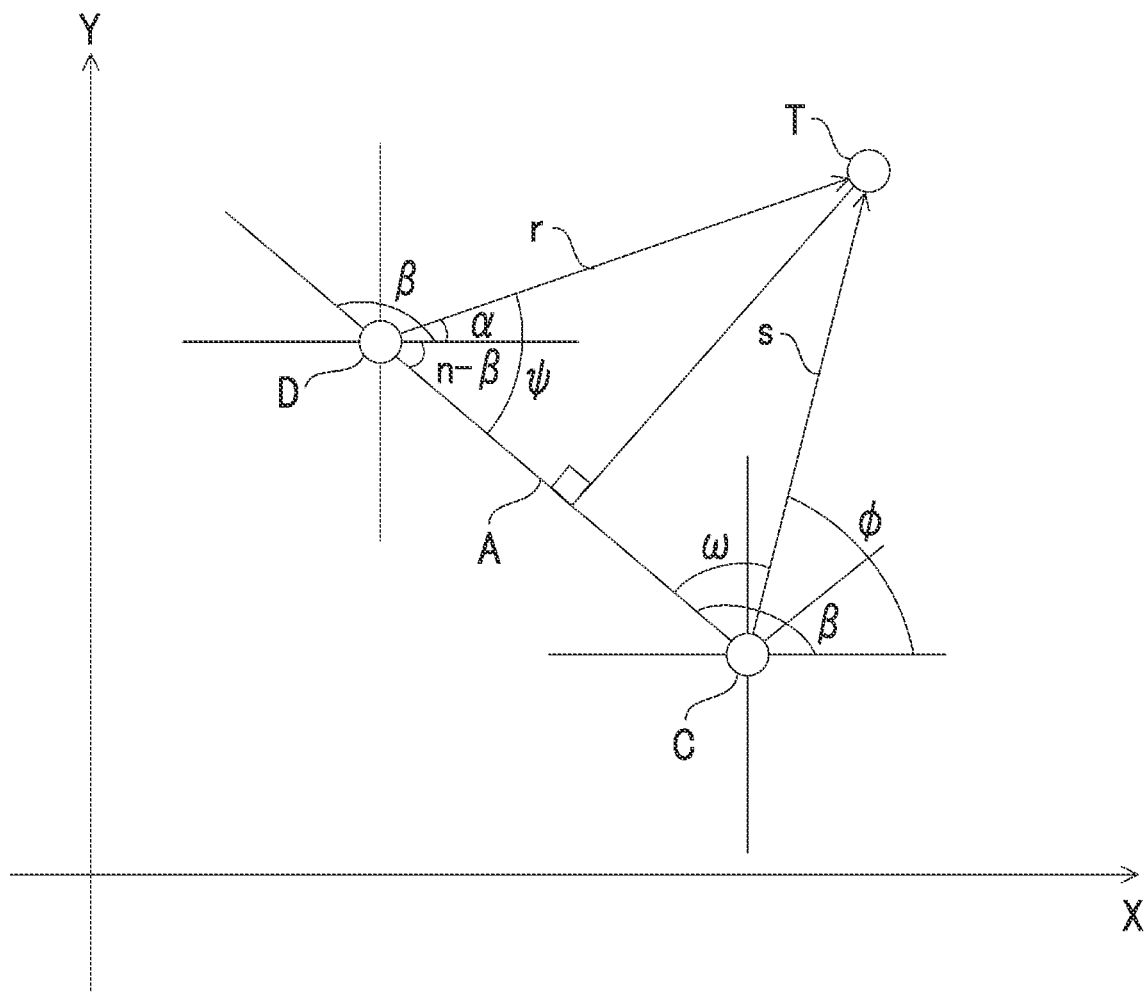
FIG. 18 is a diagram (Part 1) for describing another example of the control of the orientation of the imaging with the ground camera 10.
Figure 19:
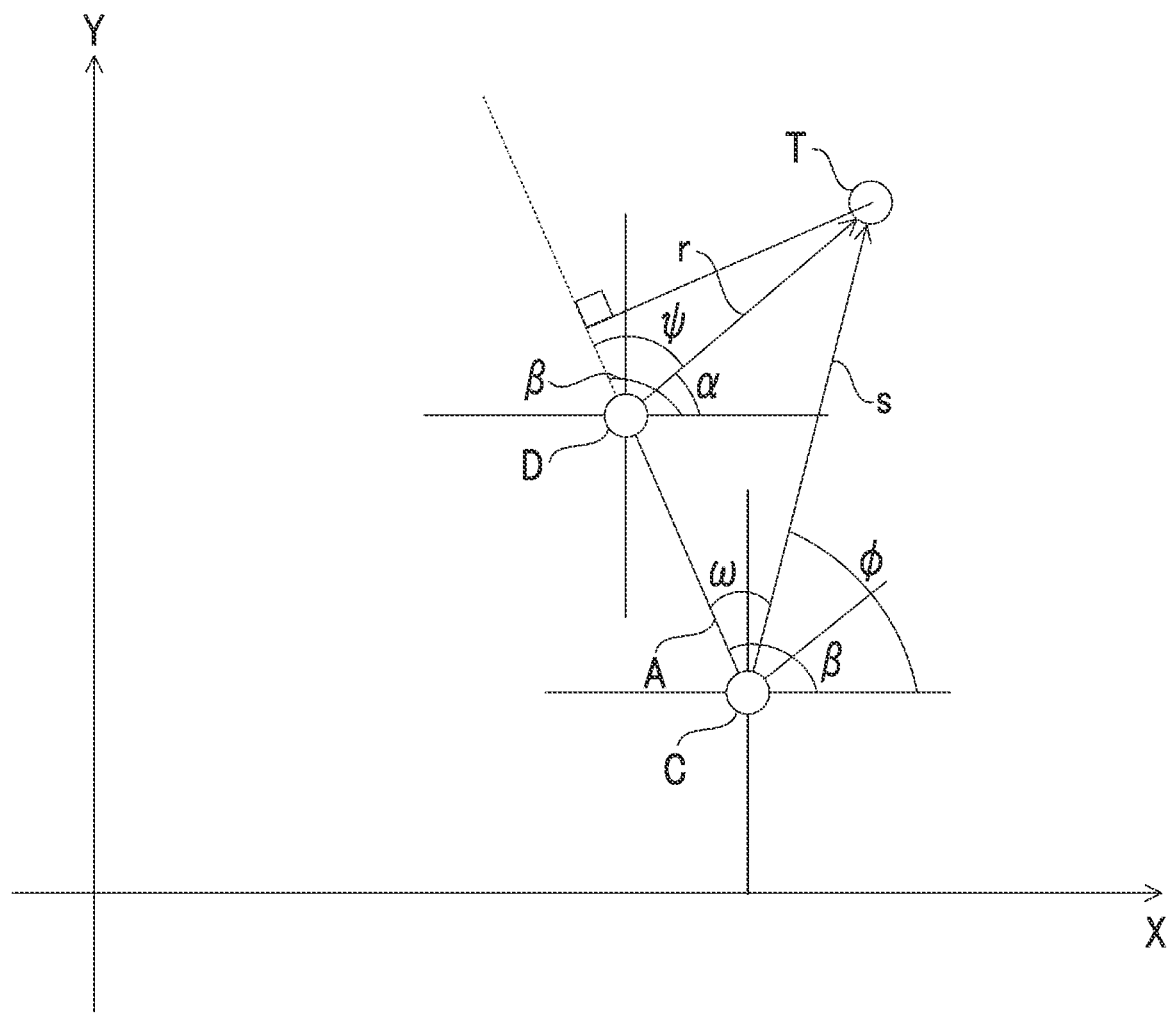
FIG. 19 is a diagram (Part 2) for describing another example of the control of the orientation of the imaging with the ground camera 10.
Figure 20:
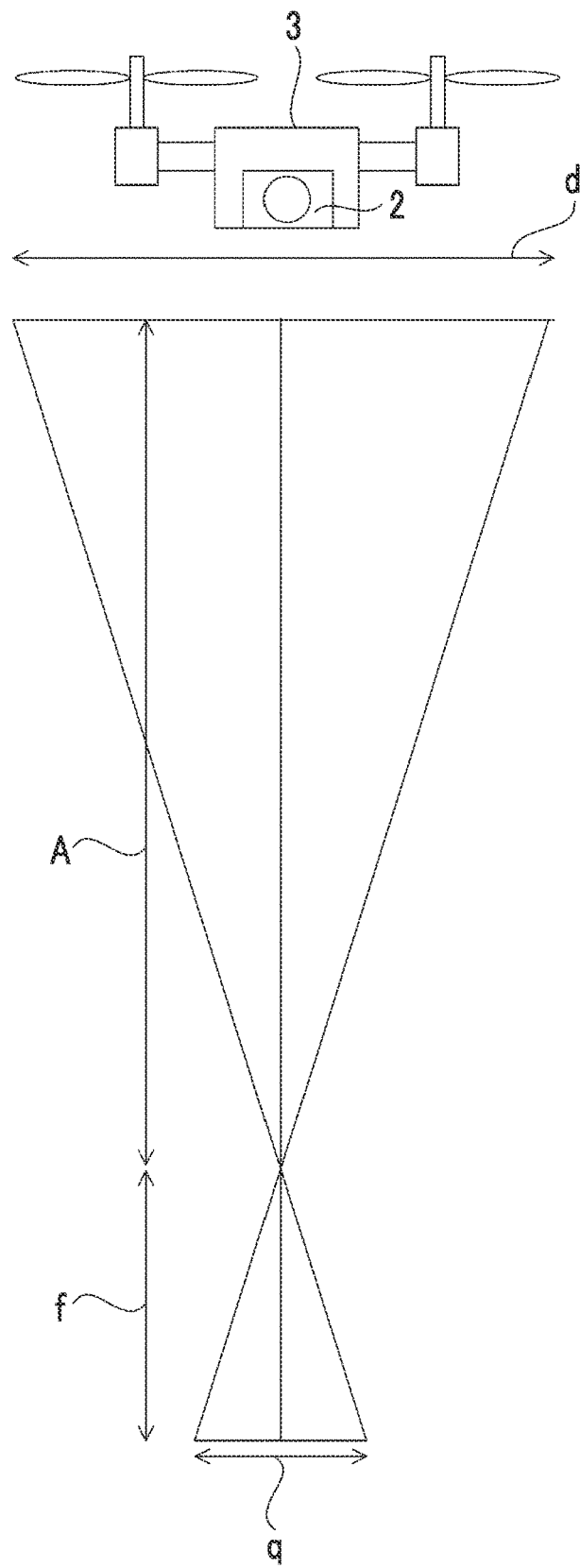
FIG. 20 is a diagram showing an example of a relationship between a size of a subject and a size of an image on an imaging surface.
Figure 21:
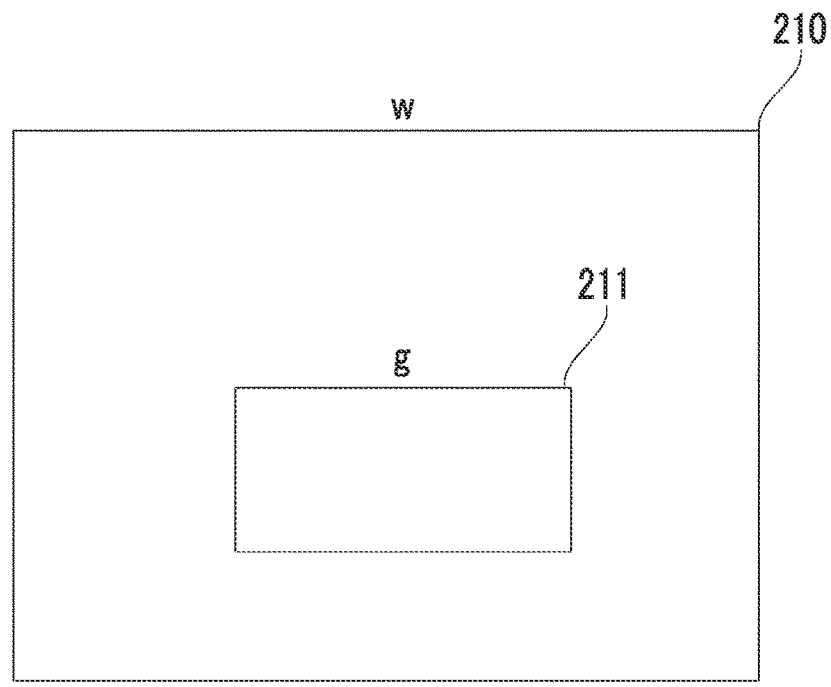
FIG. 21 is a diagram showing an example of the number of pixels of the entire image and the number of pixels of a subject portion.

FIGS. 18 and 19 are diagrams for describing other examples of the control of the orientation of the imaging with the ground camera 10. FIG. 20 is a diagram showing an example of a relationship between a size of the subject and a size of an image on an imaging surface. FIG. 21 is a diagram showing an example of the number of pixels of the entire image and the number of pixels of a subject portion. FIGS. 18 and 19 show the positional relationship between the aerial camera 2 and the imaging target part as viewed from the Z direction. Further, FIG. 18 shows a case where β−α≥π/2 [rad], and FIG. 19 shows a case where β−α<π/2 [rad].

In this example, the control of the orientation of the imaging with the ground camera 10 in a case where the position information of the aerial camera 2 cannot be acquired will be described. That is, in a case where a size of the flying object 3 is known, with the imaging of the aerial camera 2 once with the ground camera 10, it is possible to automatically direct the ground camera 10 toward the imaging target part imaged by the aerial camera 2.

d shown in FIG. 20 is the size of the flying object 3. f shown in FIG. 20 is the focal length in a case where the ground camera 10 images the flying object 3. q shown in FIG. 20 is a size of an image of a portion where the flying object 3 appears on an imaging sensor of the ground camera 10.

A captured image 210 shown in FIG. 21 is a captured image obtained by capturing the flying object 3 with the ground camera 10. w shown in FIG. 21 is the number of lateral width pixels (in a case of horizontal shooting) of the entire captured image 210. A flying object region 211 shown in FIG. 21 is a region in which the flying object 3 appears in the captured image 210. The management device 11 specifies the flying object region 211 by, for example, image recognition processing. g shown in FIG. 21 is the number of lateral width pixels (in a case of horizontal shooting) of the flying object region 211.

Further, a width length (in a case of horizontal shooting) of the imaging sensor of the ground camera 10 is denoted by p.

β, α, h, θ, d, f, w, g, and p are pieces of input information that can be acquired by the management device 11. On the other hand, it is assumed that D (position of the aerial camera 2) cannot be acquired by the management device 11 or is not accurate and cannot be used even in a case where the management device 11 can acquire D.

The management device 11 calculates ω as the output information as follows based on the above-described input information. ω is the pan angle for imaging the same imaging target part as the aerial camera 2 by the ground camera 10 from a current state (in this case, state in which the flying object 3 is imaged).

In a case where a size ratio of the flying object 3 in the entire captured image 210 is denoted by u, the following Equation (2) is established.

$u=g/w$ (2)

As described above, the size of the image of the portion where the flying object 3 appears on the imaging sensor of the ground camera 10 is q. Further, the width length (in a case of horizontal shooting) of the imaging sensor of the ground camera 10 is p. Therefore, the following Equation (3) is established.

$$q=p \cdot u \qquad (3)$$

In a case where a distance on an XY plane between the ground camera 10 and the camera of the flying object 3 is denoted by A, the following Equation (4) is established.

$$A:d=f:q$$

$$A=d \cdot f/q=(d \cdot f)/(p \cdot u) \qquad (4)$$

In a case where an angle formed by a direction in which the ground camera 10 images the flying object 3 and a direction in which the aerial camera 2 mounted in the flying object 3 images the imaging target part is denoted by w, the following Equation (5) is established.

$$\psi=\pi-\beta+\alpha(\text{in a case where } \beta-\alpha \geq \pi/2 \text{ [rad]})$$

$$\psi=\beta-\alpha(\text{in a case where } \beta-\alpha < \pi/2 \text{ [rad]})$$

$$s=|s|=((A+r \cdot \cos \psi)^2+(A+r \cdot \cos \psi)^2)^{0.5}$$

$$s \cdot \sin \omega = r \cdot \sin \psi$$

$$\omega=\text{Arcsin}((r \cdot \sin \psi)/s) \qquad (5)$$

With the drive of the revolution mechanism 16 by the management device 11 based on the calculated ω using the above-described Equation (5) to cause the ground camera 10 to pan by ω, the management device 11 can be directed toward the same imaging target part as the aerial camera 2. Therefore, even in a case where the management device 11 cannot acquire the position (D) of the aerial camera 2, the ground camera 10 can image the same imaging target part as the aerial camera 2. Further, the management device 11 may perform control of causing the ground camera 10 to execute the imaging after the ground camera 10 is directed toward the imaging target part.

As described in FIGS. 18 to 21, in a case where the position (D) of the aerial camera 2 cannot be acquired, the management device 11 may receive, as the imaging information, information indicating a relative position of the aerial camera 2 with respect to the ground camera 10 (second imaging device) and the orientation of the aerial camera 2 at the time of imaging with the aerial camera 2 (first imaging device), and may perform the imaging control of controlling the orientation of the imaging with the ground camera 10 based on the pieces of the imaging information and the position and orientation of the ground camera 10.

Further, the management device 11 can calculate the relative position of the aerial camera 2 with respect to the ground camera 10 based on, for example, the captured image 210 obtained by imaging the aerial camera 2 with the ground camera 10. Accordingly, with the imaging of the aerial camera 2 once with the ground camera 10, it is possible to automatically direct the ground camera 10 toward the imaging target part imaged by the aerial camera 2.

In Embodiment 2, the case has been described in which the pan angle (ω) of the ground camera 10 is calculated and the ground camera 10 is caused to pan to direct the management device 11 toward the imaging target part. Further, the management device 11 may calculate the tilt angle for directing the ground camera 10 toward the imaging target part based on the input information and may drive the revolution mechanism 16 based on the calculated tilt angle to cause the ground camera 10 to tilt. Accordingly, even in a case where the tilt direction of the ground camera 10 does not match the imaging target part, it is possible to direct the management device 11 toward the imaging target part.

Further, the management device 11 may calculate a distance (|s|) between the ground camera 10 and the imaging target part based on the input information and may control a focus mechanism of the ground camera 10 based on the calculated distance to match the focus position in the imaging of the ground camera 10 with the imaging target part.

Modification Example 1

Although the aerial camera 2 or the ground camera 6 has been described as an example of the first imaging device, a plurality of first imaging devices may be present. That is, the management device 11 may perform the imaging control, the assist control, or the like of the second imaging device (for example, the ground camera 10) based on captured images or imaging information obtained by the plurality of first imaging devices.

Modification Example 2

Although the ground camera 10 has been described as an example of the second imaging device, the second imaging device may be an aerial camera.

Modification Example 3

Although the flying object 3 has been described as the moving object equipped with the first imaging device, the moving object equipped with the first imaging device may be an automobile, a ship, an autonomous moving robot, or the like. Further, a configuration may be employed in which the second imaging device is mounted in the moving object.

Modification Example 4

Although the GPS unit or the like has been described as the acquisition unit of the position information, the acquisition unit of the position information is not limited to the GPS unit, may be a real time kinematic (RTK) unit, or may be a combination of the GPS unit and the RTK unit.

Modification Example 5

The configuration has been described in which the management device 11 performs the imaging control or the assist control of the second imaging device based on the captured image or the imaging information obtained by the first imaging device. However, a configuration may be employed in which the management device 11 performs the assist control of the second imaging device without performing the imaging control of the second imaging device, based on the captured image or the imaging information obtained by the first imaging device.

Modification Example 6

In each embodiment described above, the example has been described in which the imaging control program of each embodiment is stored in the storage 60B of the management device 11, and the CPU 60A of the management device 11 executes the imaging control program in the memory 60C. However, the technique of the present disclosure is not limited thereto.

Figure 22:
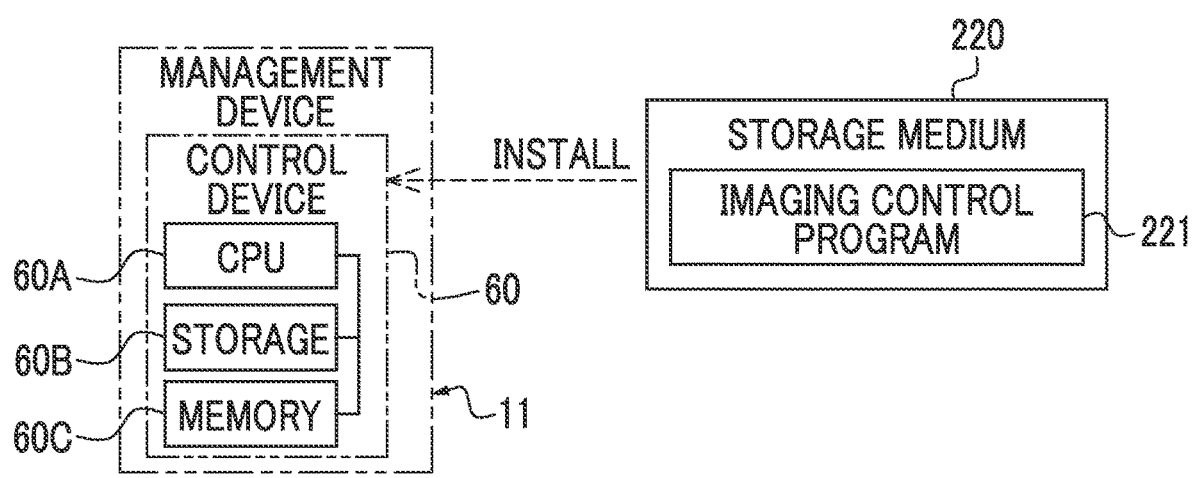
FIG. 22 is a diagram showing an example of an aspect in which an imaging control program is installed on a control device 60 of the management device 11 from a storage medium in which the imaging control program of the embodiment is stored.

FIG. 22 is a diagram showing an example of an aspect in which the imaging control program is installed in the control device 60 of the management device 11 from a storage medium in which the imaging control program of the embodiment is stored. For example, as shown in FIG. 21 as an example, an imaging control program 221 may be stored in a storage medium 220 which is a non-transitory storage medium. In the case of the example shown in FIG. 21, the imaging control program 221 stored in the storage medium 220 is installed in the control device 60, and the CPU 60A executes the imaging control or the like described above according to the imaging control program 221.

In the example shown in FIG. 21, the CPU 60A is a single CPU. However, the technique of the present disclosure is not limited thereto, and a plurality of CPUs may be employed. An example of the storage medium 220 includes any portable storage medium such as an SSD or a universal serial bus (USB) memory. Further, the imaging control program 221 may be stored in a storage unit of another computer, a server device, or the like connected to the control device 60 via a communication network (not illustrated), and the imaging control program 221 may be downloaded to the control device 60 in response to a request from the management device 11. In this case, the downloaded imaging control program 221 is executed by the CPU 60A of the control device 60.

Modification Example 7

A shape of the aerial camera 2 or the ground camera 10 is not limited to the shape shown in the drawing, and various shapes can be used. Further, the aerial camera 2 or the ground camera 10 may be a smartphone, a tablet terminal, a laptop computer, a compact digital camera, or the like.

At least the following matters are described in the present specification.

(1)
An imaging control device comprising:
a memory; and
a processor,
wherein the memory records a captured image obtained by capturing with a first imaging device and imaging information related to the imaging in association with each other, and
the processor is configured to perform imaging control of controlling imaging with a second imaging device different from the first imaging device, based on at least any one of the captured image or the imaging information.

(2)
The imaging control device according to (1),
wherein the imaging with the second imaging device is imaging of a part, which is different from a part imaged by the first imaging device, in a subject to be imaged by the first imaging device.

(3)
The imaging control device according to (2),
wherein the imaging control includes setting of an imaging parameter by the second imaging device based on the imaging information.

(4)
The imaging control device according to (2) or (3),
wherein the imaging information includes position information of the first imaging device at a time of the imaging with the first imaging device, and
the processor is configured to perform control based on a difference between position information of a third imaging device that images the first imaging device imaging the subject, which is obtained by the third imaging device, and the position information of the first imaging device.

(5)
The imaging control device according to any one of (2) to (4),
wherein the processor is configured to perform control of selecting an imaging target part of the second imaging device from among parts of the subject set in advance.

(6)
The imaging control device according to (5),
wherein the imaging information includes imaging completion information indicating the part, among the parts of the subject, imaged by the first imaging device, and
the processor is configured to perform the control of selecting the imaging target part of the second imaging device based on the imaging completion information.

(7)
The imaging control device according to (5) or (6),
wherein the imaging information includes flag information indicating whether or not the corresponding captured image satisfies a predetermined condition, and
the processor is configured to perform the control of selecting the imaging target part of the second imaging device based on the flag information.

(8)
The imaging control device according to any one of (5) to (7),
wherein the imaging information includes flag information indicating whether or not capturing of the corresponding captured image is aerial imaging, and
the processor is configured to perform the control of selecting the imaging target part of the second imaging device based on the flag information.

(9)
The imaging control device according to any one of (5) to (8),
wherein the imaging information includes performance information indicating a model or imaging performance of the first imaging device, and
the processor is configured to perform the control of selecting the imaging target part of the second imaging device based on the performance information and a model or imaging performance of the second imaging device.

(10)
The imaging control device according to any one of (1) to (9),
wherein the first imaging device is capable of performing automatic imaging on a plurality of parts of a subject,
the imaging information includes a log of the automatic imaging, and
the processor is configured to perform automatic imaging control of controlling the automatic imaging on the plurality of parts with the first imaging device or the second imaging device based on the imaging information.

(11)
The imaging control device according to (1),
wherein the imaging of the subject with the second imaging device is imaging in an orientation different from an orientation of the imaging of the subject with the first imaging device.

(12)

The imaging control device according to (11),
wherein the imaging information includes information indicating a position and an orientation of the first imaging device at a time of the imaging with the first imaging device, and
the imaging control includes control of the orientation of the imaging with the second imaging device based on the imaging information and a position and an orientation of the second imaging device.

(13)

The imaging control device according to (11),
wherein the imaging information includes information indicating a relative position of the first imaging device with respect to the second imaging device and an orientation of the first imaging device at a time of the imaging with the first imaging device, and
the imaging control includes control of the orientation of the imaging with the second imaging device based on the imaging information and a position and an orientation of the second imaging device.

(14)

The imaging control device according to (13),
wherein the relative position is calculated based on a captured image obtained by capturing the first imaging device with the second imaging device.

(15)

The imaging control device according to any one of (1) to (14),
wherein at least any one of the first imaging device or the second imaging device includes an imaging device mounted in a moving object.

(16)

The imaging control device according to (15),
wherein the moving object is a flying object.

(17)

An imaging system comprising:
a first imaging device;
a second imaging device; and
an imaging control device including a communication unit that is communicable with the first imaging device and the second imaging device,
wherein the imaging control device records a captured image obtained by capturing with the first imaging device in association with imaging information related to the imaging, and performs imaging control of controlling imaging with the second imaging device based on at least any one of the captured image or the imaging information.

(18)

An imaging control method by an imaging control device including a memory and a processor, the imaging control method comprising:
by the memory,
recording a captured image obtained by capturing with a first imaging device and imaging information related to the imaging in association with each other; and
by the processor,
performing imaging control of controlling imaging with a second imaging device different from the first imaging device, based on at least any one of the captured image or the imaging information.

(19)

An imaging control program executed by an imaging control device including a memory that records a captured image obtained by capturing with a first imaging device and imaging information related to the imaging in association with each other and a processor, the imaging control program causing the processor to execute a process comprising:
performing imaging control of controlling imaging with a second imaging device different from the first imaging device, based on at least any one of the captured image or the imaging information.

While various embodiments are described above with reference to the drawings, the present invention is not limited to such examples. It is apparent that those skilled in the art may perceive various modification examples or correction examples within the scope disclosed in the claims, and those examples are also understood as falling within the technical scope of the present invention. Further, any combination of various components in the embodiment may be used without departing from the gist of the invention.

The present application is based on Japanese Patent Application (JP2021-124856) filed on Jul. 29, 2021, the content of which is incorporated in the present application by reference.

EXPLANATION OF REFERENCES

1: imaging system
2: aerial camera
3: flying object
4: transmission tower
5: electrical wire
6, 10: ground camera
7: smartphone
8,9: imaging person
11: management device
12: communication line
13, 43B: display
14: secondary storage device
15: optical system
15B: lens group
15B1: anti-vibration lens
15B2: zoom lens
16: revolution mechanism
17, 21: lens actuator
19: computer
22: BIS driver
23: OIS driver
25: imaging element
25A: light-receiving surface
27: imaging element actuator
28: lens driver
29: lens-side shake correction mechanism
31: DSP
32: image memory
33: electronic shake correction unit
34, 66 to 68: communication I/F
35, 60C: memory
36, 60B: storage
37, 60A: CPU
38, 70: bus
39, 47: position detection sensor
40: shake-amount detection sensor
43: UI system device
43A, 62: reception device
45: imaging element-side shake correction mechanism
60: control device
71: yaw-axis revolution mechanism
72: pitch-axis revolution mechanism
73, 74: motor
75, 76: driver 81, 210: captured image
82: imaging information table
100: imaging map
101: current location mark
211: flying object region
220: storage medium
221: imaging control program
p1 to p8: imaging part

What is claimed is:

1. An imaging control device comprising:
a memory; and
a processor,
wherein the memory is configured to record a captured image obtained by capturing with a first imaging device and imaging information including position information of the first imaging device at a time of the imaging with the first imaging device in association with each other, and
the processor is configured to perform imaging control of controlling a second imaging device different from the first imaging device to image a second part of a subject different from a first part of the subject imaged by the first imaging device based on a difference between position information of a third imaging device and the position information of the first imaging device, wherein the third imaging device images the first imaging device imaging the subject to obtain the difference.

2. The imaging control device according to claim 1,
wherein the imaging control includes setting of an imaging parameter by the second imaging device based on the imaging information.

3. The imaging control device according to claim 1,
wherein the processor is configured to perform control of selecting an imaging target part of the second imaging device from among parts of the subject set in advance.

4. The imaging control device according to claim 3,
wherein the imaging information includes imaging completion information indicating the first part, among the parts of the subject, imaged by the first imaging device, and
the processor is configured to perform the control of selecting the imaging target part of the second imaging device based on the imaging completion information.

5. The imaging control device according to claim 3,
wherein the imaging information includes flag information indicating whether or not the corresponding captured image satisfies a predetermined condition, and
the processor is configured to perform the control of selecting the imaging target part of the second imaging device based on the flag information.

6. The imaging control device according to claim 3,
wherein the imaging information includes flag information indicating whether or not capturing of the corresponding captured image is aerial imaging, and
the processor is configured to perform the control of selecting the imaging target part of the second imaging device based on the flag information.

7. The imaging control device according to claim 3,
wherein the imaging information includes performance information indicating a model or imaging performance of the first imaging device, and
the processor is configured to perform the control of selecting the imaging target part of the second imaging device based on the performance information and a model or imaging performance of the second imaging device.

8. The imaging control device according to claim 1,
wherein the first imaging device is capable of performing automatic imaging on a plurality of parts of a subject,
the imaging information includes a log of the automatic imaging, and
the processor is configured to perform automatic imaging control of controlling the automatic imaging on the plurality of parts with the first imaging device or the second imaging device based on the imaging information.

9. The imaging control device according to claim 1,
wherein at least one of the first imaging device or the second imaging device includes an imaging device mounted on a moving object.

10. The imaging control device according to claim 9,
wherein the moving object is a flying object.

11. An imaging system comprising:
a first imaging device;
a second imaging device; and
an imaging control device including a communication unit that is communicable with the first imaging device and the second imaging device,
wherein the imaging control device records a captured image obtained by capturing with the first imaging device in association with imaging information including position information of the first imaging device at a time of the imaging with the first imaging device, and performs imaging control of controlling the second imaging device to image a second part different from a first part of the subject imaged by the first imaging device based on a difference between position information of a third imaging device and the position information of the first imaging device, wherein the third imaging device images the first imaging device imaging the subject to obtain the difference.

12. An imaging control method by an imaging control device including a memory and a processor, the imaging control method comprising:
by the memory,
recording a captured image obtained by capturing with a first imaging device and imaging information including position information of the first imaging device at a time of the imaging with the first imaging device in association with each other; and
by the processor,
performing imaging control of controlling a second imaging device different from the first imaging device to image a second part of a subject, different from a first part of the subject imaged by the first imaging device based on a difference between position information of a third imaging device and the position information of the first imaging device, wherein the third imaging device images the first imaging device imaging the subject, to obtain the difference.

13. A non-transitory computer readable medium storing an imaging control program executed by an imaging control device including a memory that records a captured image obtained by capturing with a first imaging device and imaging information including position information of the first imaging device at a time of the imaging with the first imaging device in association with each other, and a processor, the imaging control program causing the processor to execute a process comprising:
performing imaging control of controlling a second imaging device different from the first imaging device to image a second part different from a first part of the subject imaged by the first imaging device, based on a difference between position information of a third imaging device and the position information of the first imaging device, wherein the third imaging device images the first imaging device imaging the subject to obtain the difference.

14. An imaging control device comprising:

a memory; and a processor, wherein the memory is configured to record a captured image obtained by capturing with a first imaging device and imaging information including flag information indicating whether or not capturing of the corresponding captured image is aerial imaging, in association with each other, and the processor is configured to perform imaging control of controlling a second imaging device different from the first imaging device to image a second part different from a first part of the subject imaged by the first imaging device based on at least one of the captured image or the imaging information, and perform, based on the flag information, control of selecting an imaging target part of the second imaging device from among parts of the subject set in advance.

15. An imaging control device comprising:

a memory; and a processor, wherein the memory is configured to record a captured image obtained by capturing with a first imaging device and imaging information including performance information indicating a model or imaging performance of the first imaging device, in association with each other, and the processor is configured to perform imaging control of controlling a second imaging device different from the first imaging device to image a second part different from a first part of the subject imaged by the first imaging device based on at least one of the captured image or the imaging information, and perform, based on the performance information and a model or imaging performance of the second imaging device, control of selecting an imaging target part of the second imaging device from among parts of the subject set in advance.

* * * * *